US012079357B2

(12) United States Patent
Thoren et al.

(10) Patent No.: US 12,079,357 B2
(45) Date of Patent: Sep. 3, 2024

(54) MULTI-USER ACCESS CONTROLS IN ELECTRONIC SIMULTANEOUSLY EDITABLE DOCUMENT EDITOR

(71) Applicant: Palantir Technologies Inc., Denver, CO (US)

(72) Inventors: Paul Thoren, Oakton, VA (US); Benjamin Gazzard, London (GB); David Meiklejohn, Arlington, VA (US); Kevin Ng, New York, NY (US); Matthew Fedderly, Baltimore, MD (US); Rhys Brett-Bowen, London (GB)

(73) Assignee: Palantir Technologies Inc., Denver, CO (US)

( * ) Notice: Subject to any disclaimer, the term of this patent is extended or adjusted under 35 U.S.C. 154(b) by 54 days.

(21) Appl. No.: 17/448,103

(22) Filed: Sep. 20, 2021

(65) Prior Publication Data

US 2022/0004656 A1  Jan. 6, 2022

Related U.S. Application Data

(63) Continuation of application No. 16/260,735, filed on Jan. 29, 2019, now Pat. No. 11,151,271, which is a
(Continued)

(51) Int. Cl.
*G06F 21/62* (2013.01)
*G06F 16/25* (2019.01)
*G06F 16/26* (2019.01)

(52) U.S. Cl.
CPC ........ *G06F 21/6218* (2013.01); *G06F 16/252* (2019.01); *G06F 16/26* (2019.01); *G06F 2221/2113* (2013.01)

(58) Field of Classification Search
CPC ............. G06F 21/6218; G06F 17/0356; G06F 17/30572; G06F 16/26; G06F 16/252;
(Continued)

(56) References Cited

U.S. PATENT DOCUMENTS 5,745,714 A  4/1998  Glass et al.
5,826,021 A  10/1998  Mastors et al.
(Continued)

FOREIGN PATENT DOCUMENTS

AU  2014203669  5/2016
CN  102054015  5/2014
(Continued)

OTHER PUBLICATIONS

"A Tour of Pinboard," <http://pinboard.in/tour> as printed May 15, 2014 in 6 pages.
(Continued)

*Primary Examiner* — Matthew T Henning
(74) *Attorney, Agent, or Firm* — Knobbe, Martens, Olson & Bear, LLP

(57) ABSTRACT

A system with an interactive user interface for a plurality of users to author an electronic document simultaneously is described. The system displays visual feedback on the interface to prevent the users from interfering with one another. The system displays data from a remote database linked into the document based on unique identifiers. The data is displayed as an "artifact." The system monitors and tracks each user's access category level, as well as the access category level of each piece of data pulled from the remote database. The system compares a user's category level to the data from the database to make visible only the portions of the document the user has the appropriate access category level to view and/or modify. The portions of the document that have a higher category level than the user will be hidden
(Continued)

from the user either in part or completely. Also, there may be an indicator to the user of such redacted or hidden content from the user's viewer.

20 Claims, 15 Drawing Sheets

Related U.S. Application Data continuation of application No. 15/829,654, filed on Dec. 1, 2017, now Pat. No. 10,235,533.

(58) Field of Classification Search
CPC ......... G06F 2221/2113; G06F 2111/02; G06T 2219/024; G06Q 10/101
USPC .......................................................... 726/28
See application file for complete search history.

(56) References Cited

U.S. PATENT DOCUMENTS

| | | | |
|---|---|---|---|
| 5,832,218 A | 11/1998 | Gibbs et al. | |
| 5,878,434 A | 3/1999 | Draper et al. | |
| 5,897,636 A | 4/1999 | Kaeser | |
| 5,966,706 A | 10/1999 | Biliris et al. | |
| 6,006,242 A | 12/1999 | Poole et al. | |
| 6,057,757 A | 5/2000 | Arrowsmith et al. | |
| 6,101,479 A | 8/2000 | Shaw | |
| 6,134,582 A | 10/2000 | Kennedy | |
| 6,243,717 B1 | 6/2001 | Gordon et al. | |
| 6,430,305 B1 | 8/2002 | Decker | |
| 6,463,404 B1 | 10/2002 | Appleby | |
| 6,519,627 B1 | 2/2003 | Dan et al. | |
| 6,523,019 B1 | 2/2003 | Borthwick | |
| 7,058,648 B1 | 6/2006 | Lightfoot et al. | |
| 7,403,942 B1 | 7/2008 | Bayliss | |
| 7,461,158 B2 | 12/2008 | Rider et al. | |
| 7,627,489 B2 | 12/2009 | Schaeffer et al. | |
| 7,669,051 B2 | 2/2010 | Redlich et al. | |
| 7,739,246 B2 | 6/2010 | Mooney et al. | |
| 7,757,220 B2 | 7/2010 | Griffith et al. | |
| 7,912,842 B1 | 3/2011 | Bayliss | |
| 7,962,495 B2 | 6/2011 | Jain et al. | |
| 8,117,022 B2 | 2/2012 | Linker | |
| 8,126,848 B2 | 2/2012 | Wagner | |
| 8,290,838 B1 | 10/2012 | Thakur et al. | |
| 8,302,855 B2 | 11/2012 | Ma et al. | |
| 8,364,642 B1 | 1/2013 | Garrod | |
| 8,386,377 B1 | 2/2013 | Xiong et al. | |
| 8,392,556 B2 | 3/2013 | Goulet et al. | |
| 8,417,715 B1 | 4/2013 | Bruckhaus et al. | |
| 8,429,527 B1 | 4/2013 | Arbogast | |
| 8,554,719 B2 | 10/2013 | McGrew | |
| 8,601,326 B1 | 12/2013 | Kirn | |
| 8,639,552 B1 | 1/2014 | Chen et al. | |
| 8,688,573 B1 | 4/2014 | Ruknoic et al. | |
| 8,798,354 B1 | 8/2014 | Bunzel et al. | |
| 8,812,444 B2 | 8/2014 | Garrod et al. | |
| 8,838,538 B1 | 9/2014 | Landau et al. | |
| 8,855,999 B1 | 10/2014 | Elliot | |
| 8,903,717 B2 | 12/2014 | Elliot | |
| 8,924,388 B2 | 12/2014 | Elliot et al. | |
| 8,924,389 B2 | 12/2014 | Elliot et al. | |
| 8,938,434 B2 | 1/2015 | Jain et al. | |
| 8,938,686 B1 | 1/2015 | Erenrich et al. | |
| 9,105,000 B1 | 8/2015 | White et al. | |
| 9,230,060 B2 | 1/2016 | Friedlander et al. | |
| 9,286,373 B2 | 3/2016 | Elliot et al. | |
| 9,348,499 B2 | 5/2016 | Aymeloglu et al. | |
| 9,348,851 B2 | 5/2016 | Kirn | |
| 9,871,796 B1 | 1/2018 | Sowa et al. | |
| 10,235,533 B1 | 3/2019 | Thoren et al. | |
| 10,701,079 B1 * | 6/2020 | Ledet ................... | H04L 63/102 |
| 11,151,271 B2 | 10/2021 | Thoren et al. | |
| 2002/0035590 A1 | 3/2002 | Eibach et al. | |
| 2002/0095360 A1 | 7/2002 | Joao | |
| 2002/0103705 A1 | 8/2002 | Brady | |
| 2002/0194058 A1 | 12/2002 | Eldering | |
| 2003/0061132 A1 | 3/2003 | Mason et al. | |
| 2003/0074187 A1 | 4/2003 | Ait-Mokhtar et al. | |
| 2003/0088438 A1 | 5/2003 | Maughan et al. | |
| 2003/0093401 A1 | 5/2003 | Czahkowski et al. | |
| 2003/0105759 A1 | 6/2003 | Bess et al. | |
| 2003/0115481 A1 | 6/2003 | Baird et al. | |
| 2003/0126102 A1 | 7/2003 | Borthwick | |
| 2003/0149646 A1 | 8/2003 | Chen et al. | |
| 2003/0171942 A1 | 9/2003 | Gaito | |
| 2003/0177112 A1 | 9/2003 | Gardner | |
| 2003/0182313 A1 | 9/2003 | Federwisch et al. | |
| 2003/0212718 A1 | 11/2003 | Tester | |
| 2004/0003009 A1 | 1/2004 | Wilmot | |
| 2004/0006523 A1 | 1/2004 | Coker | |
| 2004/0034570 A1 | 2/2004 | Davis | |
| 2004/0083466 A1 | 4/2004 | Dapp et al. | |
| 2004/0117387 A1 | 6/2004 | Civetta et al. | |
| 2004/0153451 A1 | 8/2004 | Phillips et al. | |
| 2004/0179822 A1 * | 9/2004 | Tsumagari ........... | H04N 9/8205 |
| | | | 386/E9.036 |
| 2004/0210763 A1 | 10/2004 | Jonas | |
| 2004/0236688 A1 | 11/2004 | Bozeman | |
| 2005/0010472 A1 | 1/2005 | Quatse et al. | |
| 2005/0097441 A1 | 5/2005 | Herbach et al. | |
| 2005/0102328 A1 | 5/2005 | Ring et al. | |
| 2005/0131935 A1 | 6/2005 | O'Leary et al. | |
| 2005/0262493 A1 | 11/2005 | Schmidt et al. | |
| 2005/0262512 A1 | 11/2005 | Schmidt et al. | |
| 2006/0010130 A1 | 1/2006 | Leff et al. | |
| 2006/0053380 A1 | 3/2006 | Spataro et al. | |
| 2006/0080283 A1 | 4/2006 | Shipman | |
| 2006/0080316 A1 | 4/2006 | Gilmore et al. | |
| 2006/0136999 A1 | 6/2006 | Kreyscher et al. | |
| 2006/0143075 A1 | 6/2006 | Carr et al. | |
| 2006/0178954 A1 | 8/2006 | Thukral et al. | |
| 2006/0218206 A1 | 9/2006 | Bourbonnais et al. | |
| 2006/0218491 A1 | 9/2006 | Grossman et al. | |
| 2006/0253502 A1 | 11/2006 | Raman et al. | |
| 2007/0000999 A1 | 1/2007 | Kubo et al. | |
| 2007/0067285 A1 | 3/2007 | Blume | |
| 2007/0162454 A1 | 7/2007 | D'Albora et al. | |
| 2007/0178501 A1 | 8/2007 | Rabinowitz et al. | |
| 2007/0192122 A1 | 8/2007 | Routson et al. | |
| 2007/0233756 A1 | 10/2007 | D'Souza et al. | |
| 2007/0271317 A1 | 11/2007 | Carmel | |
| 2007/0284433 A1 | 12/2007 | Domenica et al. | |
| 2007/0295797 A1 | 12/2007 | Herman et al. | |
| 2007/0299697 A1 | 12/2007 | Friedlander et al. | |
| 2008/0005063 A1 | 1/2008 | Seeds | |
| 2008/0126344 A1 | 5/2008 | Hoffman et al. | |
| 2008/0126951 A1 | 5/2008 | Sood et al. | |
| 2008/0140387 A1 | 6/2008 | Linker | |
| 2008/0195672 A1 | 8/2008 | Hamel et al. | |
| 2008/0208735 A1 | 8/2008 | Balet et al. | |
| 2008/0215994 A1 | 9/2008 | Harrison et al. | |
| 2008/0228467 A1 | 9/2008 | Womack et al. | |
| 2008/0267386 A1 | 10/2008 | Cooper | |
| 2008/0270316 A1 | 10/2008 | Guidotti et al. | |
| 2008/0281580 A1 | 11/2008 | Zabokritski | |
| 2008/0301042 A1 | 12/2008 | Patzer | |
| 2008/0313132 A1 | 12/2008 | Hao et al. | |
| 2009/0055487 A1 | 2/2009 | Moraes et al. | |
| 2009/0094270 A1 | 4/2009 | Alirez et al. | |
| 2009/0106178 A1 | 4/2009 | Chu | |
| 2009/0106242 A1 | 4/2009 | McGrew | |
| 2009/0112745 A1 | 4/2009 | Stefanescu | |
| 2009/0157732 A1 | 6/2009 | Hao et al. | |
| 2009/0164387 A1 | 6/2009 | Armstrong et al. | |
| 2009/0187546 A1 | 7/2009 | Whyte et al. | |
| 2009/0216562 A1 | 8/2009 | Faulkner et al. | |
| 2009/0228365 A1 | 9/2009 | Tomchek et al. | |
| 2009/0228507 A1 | 9/2009 | Jain et al. | |
| 2009/0249244 A1 | 10/2009 | Robinson et al. | |
| 2009/0271343 A1 | 10/2009 | Vaiciulis et al. | |
| 2009/0299830 A1 | 12/2009 | West et al. | |
| 2009/0307049 A1 | 12/2009 | Elliott et al. | |

(56) References Cited

U.S. PATENT DOCUMENTS

| | | |
|---|---|---|
| 2009/0313311 A1 | 12/2009 | Hoffmann et al. |
| 2009/0313463 A1 | 12/2009 | Pang et al. |
| 2009/0319515 A1 | 12/2009 | Minton et al. |
| 2010/0057622 A1 | 3/2010 | Faith et al. |
| 2010/0070531 A1 | 3/2010 | Aymeloglu et al. |
| 2010/0070842 A1 | 3/2010 | Aymeloglu et al. |
| 2010/0076813 A1 | 3/2010 | Ghosh et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0145909 A1 | 6/2010 | Ngo |
| 2010/0204983 A1 | 8/2010 | Chung et al. |
| 2010/0306285 A1 | 12/2010 | Shah et al. |
| 2010/0332998 A1 | 12/2010 | Sun et al. |
| 2011/0004626 A1 | 1/2011 | Naeymi-Rad et al. |
| 2011/0066497 A1 | 3/2011 | Gopinath et al. |
| 2011/0093327 A1 | 4/2011 | Fordyce, III et al. |
| 2011/0099133 A1 | 4/2011 | Chang et al. |
| 2011/0173093 A1 | 7/2011 | Psota et al. |
| 2011/0208565 A1 | 8/2011 | Ross et al. |
| 2011/0208822 A1 | 8/2011 | Rathod |
| 2011/0225586 A1 | 9/2011 | Bentley et al. |
| 2011/0231930 A1 | 9/2011 | Howarth |
| 2011/0246555 A1 | 10/2011 | Hedges |
| 2011/0252282 A1 | 10/2011 | Meek et al. |
| 2011/0258216 A1 | 10/2011 | Supakkul et al. |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0078595 A1 | 3/2012 | Balandin et al. |
| 2012/0084287 A1 | 4/2012 | Lakshminarayan et al. |
| 2012/0089606 A1 | 4/2012 | Eshwar et al. |
| 2012/0136804 A1 | 5/2012 | Lucia |
| 2012/0191446 A1 | 7/2012 | Binsztok et al. |
| 2012/0215784 A1 | 8/2012 | King et al. |
| 2013/0006947 A1 | 1/2013 | Akinyemi et al. |
| 2013/0096968 A1 | 4/2013 | Van Pelt et al. |
| 2013/0097130 A1 | 4/2013 | Bingol et al. |
| 2013/0097688 A1* | 4/2013 | Bradley, II .......... G06F 21/6218 726/9 |
| 2013/0124193 A1 | 5/2013 | Holmberg |
| 2013/0132348 A1 | 5/2013 | Garrod |
| 2013/0144566 A1 | 6/2013 | De Biswas |
| 2013/0151453 A1 | 6/2013 | Bhanot et al. |
| 2013/0166480 A1 | 6/2013 | Popescu et al. |
| 2013/0226879 A1 | 8/2013 | Talukder et al. |
| 2013/0226944 A1 | 8/2013 | Baid et al. |
| 2013/0246316 A1 | 9/2013 | Zhao et al. |
| 2013/0263019 A1 | 10/2013 | Castellanos et al. |
| 2013/0325826 A1 | 12/2013 | Agarwal et al. |
| 2014/0006404 A1 | 1/2014 | McGrew et al. |
| 2014/0089339 A1 | 3/2014 | Siddiqui et al. |
| 2014/0095363 A1 | 4/2014 | Caldwell |
| 2014/0108074 A1 | 4/2014 | Miller et al. |
| 2014/0222793 A1 | 8/2014 | Sadkin et al. |
| 2014/0358829 A1 | 12/2014 | Hurwitz |
| 2015/0012509 A1 | 1/2015 | Kirn |
| 2015/0046481 A1 | 2/2015 | Elliot |
| 2015/0100907 A1 | 4/2015 | Erenrich et al. |
| 2015/0106379 A1 | 4/2015 | Elliot et al. |
| 2015/0106685 A1 | 4/2015 | Gupta |
| 2016/0036872 A1 | 2/2016 | Lappin |
| 2016/0100019 A1 | 4/2016 | Leondires |
| 2016/0321469 A1* | 11/2016 | Bhogal .................. G06F 16/93 |

FOREIGN PATENT DOCUMENTS

| | | |
|---|---|---|
| DE | 102014204827 | 9/2014 |
| DE | 102014204830 | 9/2014 |
| DE | 102014204834 | 9/2014 |
| DE | 102014213036 | 1/2015 |
| EP | 2487610 | 8/2012 |
| EP | 2778913 | 9/2014 |
| EP | 2778914 | 9/2014 |
| EP | 3035214 | 6/2016 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 2009/051987 | 4/2009 |
| WO | WO 2010/030919 | 3/2010 |
| WO | WO 2012/061162 | 5/2012 |

OTHER PUBLICATIONS

Anonymous, "A Real-World Problem of Matching Records," Nov. 2006, <http://grupoweb.upf.es/bd-web/slides/ullman.pdf> pp. 1-16.

Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.

Chaudhuri et al., "An Overview of Business Intelligence Technology," Communications of the ACM, Aug. 2011, vol. 54, No. 8., in 11 pages.

Delicious, <http://delicious.com/> as printed May 15, 2014 in 1 page.

"E-MailRelay," <http://web.archive.org/web/20080821175021/http://emailrelay.sourceforge.net/> Aug. 21, 2008, pp. 2.

Ferreira et al., "A Scheme for Analyzing Electronic Payment Systems," Brasil 1997, in 10 pages.

Gill et al., "Computerised Linking of Medical Records: Methodological Guidelines," Journal of Epidemiology and Community Health, 1993, vol. 47, pp. 316-319.

Gu et al., "Record Linkage: Current Practice and Future Directions," Jan. 15, 2004, pp. 32.

Hua et al., "A Multi-attribute Data Structure with Parallel Bloom Filters for Network Services", HiPC 2006, LNCS 4297, pp. 277-288, 2006.

Johnson, Maggie, "Introduction to YACC and Bison", Handout 13, Jul. 8, 2005, in 11 pages.

Johnson, Steve, "Access 2013 on demand," Access 2013 on Demand, May 9, 2013, Que Publishing, in 22 pages.

Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.

Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.

Mensah et al., "Security Mechanisms for Multi-User Collaborative CAx", Proceedings of the 2nd Annual Conference on Research in IT(RIIT '13), Association for Computing Machinery, New York, NY, 2013, pp. 59-60.

Nadeau et al., "A Survey of Named Entity Recognition and Classification," Jan. 15, 2004, pp. 20.

Nin et al., "On the Use of Semantic Blocking Techniques for Data Cleansing and Integration," 11th International Database Engineering and Applications Symposium, 2007, pp. 9.

Pythagoras Communications Ltd., "Microsoft CRM Duplicate Detection," Sep. 13, 2011, https://www.youtube.com/watch?v=j-7Qis0D0Kc.

Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.

Sekine et al., "Definition, Dictionaries and Tagger for Extended Named Entity Hierarchy," May 2004, pp. 1977-1980.

Wang et al., "Research on a Clustering Data De-Duplication Mechanism Based on Bloom Filter," IEEE 2010, 5 pages.

Wikipedia, "Multimap," Jan. 1, 2013, https://en.wikipedia.org/w/index.php?title=Multimap&oldid=530800748.

(56) References Cited

OTHER PUBLICATIONS

Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016, 11 pages.

Zhao et al., "Entity Matching Across Heterogeneous Data Sources: An Approach Based On Constrained Cascade Generalization," Data & Knowledge Engineering, vol. 66, No. 3, Sep. 2008, pp. 368-381.

Official Communication for U.S. Appl. No. 15/829,654 dated Apr. 19, 2018.

* cited by examiner

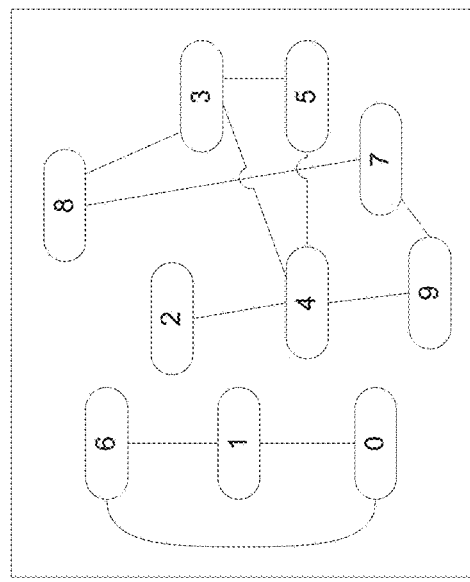

703 Example Adjacency List

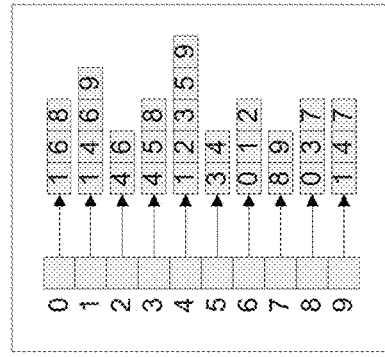

704 Example Clusters

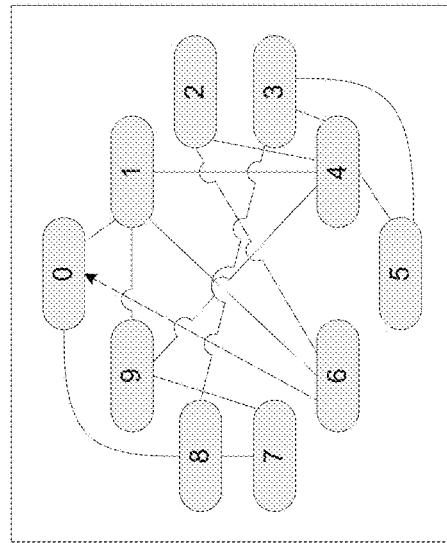

701 Example Simple Undirected Graph Data Structure

702 Example Adjacency Matrix

Graph data structure is purposefully built to handle high volume, highly connected data:
- More efficient in computing relationship queries than traditional databases, either using adjacency matrices, or adjacency lists
- Can easily add to the existing structure without endangering current functionality
  - Structure and schema of a graph model can easily flex
  - New data type and its relationship
- Evolve in step with the rest of the application and any changing business data requirements
- Can easily add weights to edges
- Use optimal amount of computer memory

FIG. 7

MULTI-USER ACCESS CONTROLS IN ELECTRONIC SIMULTANEOUSLY EDITABLE DOCUMENT EDITOR

REFERENCE TO RELATED APPLICATION

This application is a continuation of U.S. Non-Provisional application Ser. No. 16/260,735, filed Jan. 29, 2019, which is a continuation of U.S. Non-Provisional application Ser. No. 15/829,654, filed Dec. 1, 2017, now U.S. Pat. No. 10,235,533, issued Mar. 19, 2019, the disclosures of which are hereby expressly incorporated herein by reference in their entireties.

TECHNICAL FIELD

The present disclosure relates to systems and techniques for data integration, analysis, visualization, and interaction. More specifically, the systems and techniques relate to data integration, analysis, visualization, and interaction in a secure system comprising multi-level access clearance for simultaneous multi-user access.

BACKGROUND

In many work environments, it is common to have certain categories of users with varying access category levels, access clearance, or data access limitations. For example, a high category level user, or a user with high levels of access to information, could have access to particular documents or files with secure information, where a low category level user, or a user with low levels of access to information, may not have access or limited access to those same documents or files.

Also, with respect to authoring work, such work is often done serially such that one person works on an electronic document at a time. When the person is finished with their contributions they close or exit the document allowing another person access to open and contribute to the same document. Work is done this way because adequate frameworks may not exist for coordinating parallel authoring with security access limitations in mind.

Although it is desirable for users to collaborate effectively in the document authoring process, it should be done without compromising limitations on particular data, or access to said data. A tool for such collaboration should also not be hindered by such monitoring and verifying of access category levels.

SUMMARY

The disclosure herein presents various embodiments of systems and techniques related to data integration, analysis, visualization, and interaction in a secure system comprising multi-level access clearance for simultaneous multi-user access.

In the collaborative electronic work environments described herein, support for collaborative authoring in electronic workspaces may yield greatly improved accuracy and completeness, with significant real-world results. This is especially true because, in certain implementations, the tools described herein allow varying categories of users, with different levels of access clearance, to work simultaneously in a particular electronic document. Work may be done without compromising any secure data and without limiting the user's ability to do the work.

For example, a high category user, or a user with high levels of access to information, may include sensitive information in a document the user is working in. Another low category user, or a user with low levels of access to information, may be working in the same document as the high category user. The low category user would be able to view or modify the information that should otherwise not be available to the low category user. Because the document can be edited simultaneously by multiple users with varying levels of access, the system may protect the sensitive information from being viewed or modified by those users that do not have the appropriate category level, in real-time and in the same electronic document.

The system described herein may provide the ability for many users to author a document simultaneously, with visual feedback to prevent them from interfering with one another. The system has a built-in connection from a document to a reference database, with the consequent ability to see other users' objects, and link to those objects, as they are being brought into the document in "artifacts", or tagged in the document.

In an implementation, the system monitors and tracks each user's category level as well as each piece of data pulled from the reference database. The system may compare a user's category level to each database-linked element in an artifact, or alternatively, each artifact, to make visible only the portions of the document the user has access clearance to view or modify. The portions of the document that have a higher category level than the user may be hidden from the user either in part or completely. Also, although not required, there may be an indicator to the user of such redacted or hidden content from the user's viewer. In some embodiments, a database-linked element in an artifact is data (for example, a name, date, location, or other stored value) that is retrieved manually or automatically by the system based on a unique identifier as input by a user. Unique identifiers are described in more detail herein. A data object is an example of a database-linked element.

Also, by keeping such data away from the users' local hard drives, particular sensitive data can be kept remotely to improve security and to further limit access to such information to those with the appropriate access category level.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display enabling a user to more quickly access, navigate, assess, and digest information than previous systems. Specifically, a user can access and view contributions and analysis of other users in real-time as the other users are creating their work.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present maps object relationships or graphs displaying one or more significant events.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described herein, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, a computing system for dynamically generating a database-linked electronic visualization interface with multi-user access and control comprises: one or more computer readable storage devices configured to store a plurality of computer executable instructions; and one or more hardware computer processors in communication with the one or more computer readable storage devices and configured to execute the plurality of computer executable instructions in order to cause the computing system to: generate a database-linked electronic visualization interface, wherein the electronic visualization interface is configured to be modified by a plurality of users simultaneously, wherein the plurality of users comprise access category levels; cause display of the electronic visualization interface, the electronic visualization interface comprising: a dynamic document configured to depict a plurality of dynamically interactive artifacts; and at least one indicator configured to indicate a particular user currently accessing or modifying the document; determine, in response to a user accessing the document, an access category level of the user; electronically receive, via the electronic visualization interface, instructions to render a new artifact and one or more unique identifiers; access a second electronic database to obtain database-linked information related to the one or more unique identifiers to incorporate into the new artifact; determine an access category level of the database-linked information; and update the electronic visualization interface with the new artifact, wherein: the new artifact is viewable and modifiable by the user based at least in part on a comparison of the user's access category level to the access category level of the database-linked information. In some embodiments, the computing system may also comprise database-linked information associated with the new artifact comprises a plurality of database-linked objects, each database-linked object comprising its own access category level, wherein the access category level of the new artifact is based at least in part on the access category levels of the plurality of database-linked objects, and/or wherein access category level of the new artifact is the highest of all access category levels of the plurality of database-linked objects. In another embodiment, the new artifact is viewable and modifiable by the user if the user has a higher access category level than the access category level of the new artifact. In another embodiment, the new artifact is not viewable by the user with a lower access category level than the access category level associated with the new artifact.

In some embodiments, a computing system for dynamically generating a database-linked electronic visualization interface with multi-user access and control one or more computer readable storage devices configured to store a plurality of computer executable instructions; and one or more hardware computer processors in communication with the one or more computer readable storage devices and configured to execute the plurality of computer executable instructions in order to cause the computing system to: generate artifacts that match a user's access category level and anything with a category level below the user's level.

In some embodiments, a computing system for dynamically generating a database-linked electronic visualization interface with multi-user access and control one or more computer readable storage devices configured to store a plurality of computer executable instructions; and one or more hardware computer processors in communication with the one or more computer readable storage devices and configured to execute the plurality of computer executable instructions in order to cause the computing system to: generate artifacts that match a user's access category level and anything with a category level below the user's level.

In some embodiments, a computing system for dynamically generating a database-linked electronic visualization interface with multi-user access and control one or more computer readable storage devices configured to store a plurality of computer executable instructions; and one or more hardware computer processors in communication with the one or more computer readable storage devices and configured to execute the plurality of computer executable instructions in order to cause the computing system to: depict a symbol or placeholder retaining the same shape and size of the artifact to indicate that an artifact exists and is hidden from a user's view if the artifact has a higher access category level than the access category level of the user. In some embodiments, the system may depict the access category level required to view the artifact. In some embodiments, the system may display or hide the name or identity of the original user who contributed the particular secure artifact, or in some embodiments the database-linked information, hidden from the user's view.

In some embodiments, a computing system for dynamically generating a database-linked electronic visualization interface with multi-user access and control one or more computer readable storage devices configured to store a plurality of computer executable instructions; and one or more hardware computer processors in communication with the one or more computer readable storage devices and configured to execute the plurality of computer executable instructions in order to cause the computing system to: generate a timeline of user contributions and edits. In some embodiments, the system is configured hide the contributions or edits that are above a user's access category level.

In some embodiments, a computing system for dynamically generating a database-linked electronic visualization interface with multi-user access and control one or more computer readable storage devices configured to store a plurality of computer executable instructions; and one or more hardware computer processors in communication with the one or more computer readable storage devices and configured to execute the plurality of computer executable instructions in order to cause the computing system to: access an electronic database to obtain pre-programmed instructions to enable determination of how to render a new artifact.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIGS. 1A-1E illustrate embodiments of a multi-user access and collaboration system graphical user interface depicting example viewable and editable documents, toolbars, various artifact samples, and various implementations of category access level controls.

FIG. 7 illustrates examples of graphs and processes associated with storing graph information, according to various embodiments of the present disclosure.

DETAILED DESCRIPTION

Figure 1A:
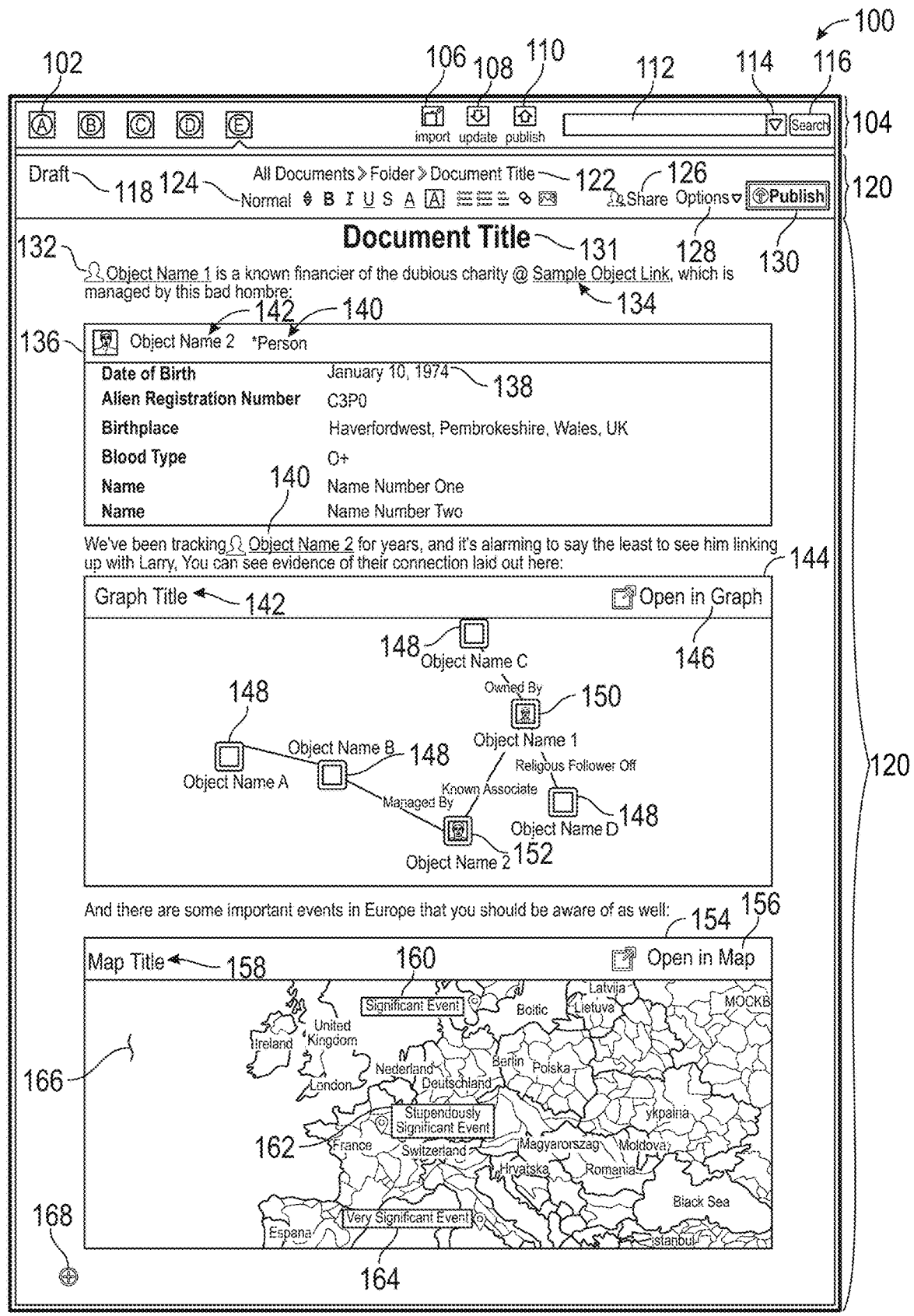

Although several embodiments, examples, and illustrations are disclosed below, it will be understood by those of ordinary skill in the art that the disclosure described herein extends beyond the specifically disclosed embodiments, examples, and illustrations and includes other uses of the disclosure and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the disclosures herein described.

Overview

The disclosure herein presents various embodiments of systems and techniques related to data integration, analysis, visualization, and interaction in a secure system comprising multi-level access clearance for simultaneous multi-user access. For example, one embodiment of the system described herein provides the ability for many users to author a document simultaneously, with visual feedback to prevent them from interfering with one another. The system has a built-in connection from a document to a reference database, with the consequent ability to see other users' objects, and link to those objects, as they are being brought into the document in "artifacts", or tagged in the document.

In the collaborative electronic work environments described herein, support for collaborative authoring in electronic workspaces may yield greatly improved accuracy and completeness, with significant real-world results. This is especially true because, in certain implementations, the tools described herein allow varying categories of users, with different levels of access clearance, to work simultaneously in a particular electronic document. Work may be done without compromising any secure data and without limiting the user's ability to do the work. The system described herein provides the ability for many users to author a document simultaneously, with visual feedback to prevent them from interfering with one another.

The system monitors and tracks each user's category level as well as each piece of data pulled from the reference database in upon the addition of a new artifact by a user, or in real-time. The system compares a user's category level to each database-linked element in an artifact, or alternatively, each entire artifact, to make visible only the portions of the document the user has access clearance to view or modify. The portions of the document that have a higher category level than the user will be hidden from the user either in part or completely. Also, by keeping such data away from the users' local hard drives and on a remote reference database, particular sensitive data can be kept remotely to improve security and to further limit access to such information to those with the appropriate access category level. In an implementation, the system monitors and tracks each user's category level as well as each piece of data pulled from the reference database.

For example, a high category user, or a user with high levels of access to information, may include sensitive information in a document the user is working in. Another low category user, or a user with low levels of access to information, may be working in the same document as the high category user. The low category user would be able to view or modify the information that should otherwise not be available to the low category user. Because the document can be edited simultaneously by multiple users with varying levels of access, the system may protect the sensitive information from being viewed or modified by those users that do not have the appropriate category level, in real-time and in the same electronic document. The portions of the document that have a higher category level than the user may be hidden from the user either in part or completely. Also, although not required, there may be an indicator to the user of such redacted or hidden content from the user's viewer.

For example, in one embodiment a user with an access category level of 4 may add an artifact with the same access category level to an electronic document. Another user, at a different user device, with an access category level of 2 may be editing the same electronic document, either concurrently or some time after the access category level 4 user added a new category level 4 artifact. From the perspective of the access category level 4 user, the artifact is completely viewable and editable in the document. From the perspective of the access category level 2 user, the same artifact may be completely hidden and unviewable in the document. Alternatively or in addition, from the perspective of the access category level 2 user, the same artifact may be hidden or unviewable, but at the location of the artifact is displayed an indicator that there is a hidden artifact. In some embodiments, the location of the hidden artifact is a placeholder element comprising no access category level 4 content but retaining the same size and shape as the original artifact. This allows the document to retain similar document formatting between the different users. Alternatively or in addition, from the perspective of the access category level 2 user, the same artifact may be partially viewable such that only the access category level 4 data is hidden from view.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Access Category Levels: Data associated with information (for example, a data object or each piece of data within the data object) and each user of the system. The data may comprise a number, letter, value, or any metric that can be used to either match or compare data between a user and an object, two users, or two objects. In some implementations there are higher access category levels and lower access category levels, where a user can only access data objects with access category levels lower or the same as the access category level associated with the user. In other implementations, the user may only access data if the access category levels match. As described herein, a higher access category level may be associated with a higher level of clearance, and a lower access category level may be associated with a lower level of clearance.

Artifact: A representation of one or more data objects. The representation may comprise a visualization (e.g., a graph or map) of, and/or may comprise links (e.g., a hyperlink or other type of automated electronic link) to, the one or more data objects. Artifacts may be included in electronic documents, such as the electronic documents described herein. Artifacts may be interactive and/or manipulable. In some implementations an artifact may include only unique identifiers associated with the one or more objects, which identifiers may be used to query a data store for further information or properties associated with the data objects. Alternatively, an artifact may include additional information associated with the one or more data objects. Various examples of artifacts and their associated characteristics are further described herein.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, extensible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Database-Linked Element or Information: Elements or information representing information that is stored in a database. In one example configuration, a data object may be associated with a unique identifier. The unique identifier may correspond to data in a database. A system may interpret the unique identifier, access the database, retrieve the data associated with the unique identifier, and then present the data as a data object. A data object is one example of a database-linked element.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Multi-User Access and Collaboration Document Tool

FIG. 1 illustrates an embodiment of a multi-user access and collaboration system graphical user interface depicting example viewable and editable documents, toolbars, various artifact samples, and various implementations of category access level controls. This description is provided for the purpose of providing an example and is not intended to limit the techniques to the example embodiments described. The data used with respect to FIG. 1 may be stored and accessed according to FIG. 2.

Navigation Pane

The navigation pane 104 may comprise buttons 102 that provide the user access to various tools. The buttons 102 may be pressed or selected by a user to activate a change in the graphical user interface to display a new page associated with the selected button 102. In some embodiments, the tools accessible by selecting the buttons 102 may include a home page, a search browser, a messaging interface, a graph, a map, an object explorer, a summary, and/or a collaboration document. Such tools are described below, but it should be appreciated that additional tools incorporating some or a combination of the features below may be used by the system. In some embodiments, tools that are unique to a particular organization may also be incorporated into the system through the buttons 102.

In some embodiments, a home page link may be included in the list of buttons 102. The home page may include a company logo, a search bar to run searches through one or more databases, customizations to searching (for example, limiting or expanding the databases to search through, various advances filtering based on the type of data, or any other advanced searching features that may be relevant to the user or company), a list of data that is searchable or is being searched through, recent company or project updates, and anything else that a user might benefit from having on a home page. In some embodiments, the search bar may include an autocomplete functionality allowing a user to begin typing and have possible results appear for the user to click on. Advantages would include assisting the user in spelling the remaining of the word, providing the results of common search terms, save the user time in entering the text, for example. In some embodiments, the autocomplete feature only displays possible results that are appropriate for the access category level of the user such that any data with a higher access category level is not displayed in the search or in the autocomplete results.

In some embodiments, a search browser may be included in the list of buttons 102. In some embodiments, the search browser may be access from any other tool or page, such as the home page. The search browser may display results of a particular search relevant to a user based on a search string typed into the interface by the user. The results may also be interacted with such that documents in the search results can be opened directly, viewed, or edited.

In some embodiments, a messaging interface may be included in the list of buttons 102. For users in a collaborative work environment it is advantageous to be able to communicate directly through the system. For example, several advantages may include efficiency in communicating such that users will not need to open another system or application, the ability to link to information or data that is natively based in the system such that the data appears in a format that is aesthetically pleasing and thorough (the data may also be remote but accessibly by the system), to preserve system resources by having only one platform running, and also to maintain security of data by monitoring the communications for inadvertent disclosure of secure content. If a user shares information above another user's access category level then the system may block the communication. In some embodiments, a notification may be sent to the user attempting to send the secure information describing the issue and providing alternative methods of communicating without violating the security of the data.

In some embodiments, a graph may be included in the list of buttons 102. The graph may display a listing of objects. Objects may include people, events, places, companies, property, user-created documents, and relationships between all objects. Objects may also comprise unique identifiers such that users or the system may be able to link directly to the particular identifier, which may be an alpha-numeric string of characters. Such a tool provides users a way of visually mapping the objects to extract information not otherwise clear. The graph may also allow users to interact with the objects in order to edit, modify, or add additional objects or information to the objects. In some embodiments, users may also access documents linked as an object to view or further contribute. In some embodiments, users may view all documents citing to or referring to the particular objects. The documents displayed would be based on the access category levels of the user and each document such that only documents with the same or less secure access category level can be viewed or opened by the user. In some embodiments, documents with more secure access category levels may appear but with an indicator (for example, grayed out) indicating to the user that the document is not viewable due to access category level restrictions, or for any other reason. For the purposes of this invention, objects may be brought into the document and turned into an artifact by a variety of methods; several example methods are disclosed in more detail in U.S. Patent Application Publication No. 2016/0210270 by Kelly et al., the contents of which is hereby incorporated by reference herein in its entirety and for all purposes.

In some embodiments, a map may be included in the list of buttons 102. The map may be configured to allow users to place or view objects on a map of a particular location (for example, countries, cities, shopping malls, or a soccer field). The objects can store the corresponding GPS coordinates in the database to be referenced by the system later. In some embodiments, users can create new events or objects while viewing the map.

In some embodiments, an object explorer may be included in the list of buttons 102. This page allows a user to view a detailed summary of each object in the database in the form of one or more lists. The user may view information in an easy-to-read format, may be able to add data or notes via an input device, or modify the data (if the user has the appropriate access category level as compared to the data's access category level). The user may also be able to run searches to find objects containing particular strings of characters or may be of a certain property types (for example, a person, event, or place), or both. Object property types are described in more detail below. Also, in some embodiments, a user may be able to select an object and drag and drop the object onto another button. This would send a link to the object onto the page of the corresponding button the user dropped the object onto. For example, if a user drags a "person" object onto the collaboration document button, the data linked to that object is sent to the collaboration document 104 page. In other embodiments, the user can drag and drop the object onto any button 102 to view the object in the respective pages. For example, dropping an object onto the object explorer button would open a detailed view of the object in the object explorer page. In another embodiment, dragging an object onto the graph button would visually show the object's relationship to other objects. In some embodiments, an application programming interface (API) or communication standard may enable the drag and drop feature. One way the API can be implemented is that by dragging and dropping an icon of an object, a unique identifier is sent to a database through an API, where the database sends back the data associated with the unique identifier. In another embodiment, standalone applications may be used together by dragging and dropping between them using APIs or other standard communication interface so that the object data can appear to transfer between the applications.

In some embodiments, a collaboration document page 100 may be included in the list of buttons 102. The collaboration document page 100 is a customizable word processing page viewable and editable by the user that created it. In some embodiments, the collaboration document page 100 is accessible and editable by anyone with the proper access category level. In other embodiments, the collaboration page 100 is only viewable or editable to users designated by the user that created the document, an administrator, or by being the member of a group with special access privileges separate from the access category level permissions. The collaboration document page 100 comprises any network or local document a user opens in the program. In some embodiments, a user may have open one collaboration document 133 at a time. In other embodiments, a user can have open multiple documents at a time. In one embodiment, if a user has multiple documents open, one or more new buttons may appear in the navigation pane 104 allowing access to the additional currently open documents. One example of a collaboration document page 100 and an exemplary current document 133 is illustrated in FIG. 1A.

Also, in some embodiments, the collaboration document 133 can be shared with one or more other users to either view or edit the document. The system monitors the collaboration document 133 and assigns the collaboration document 133 an access category level such that any sharing to a user with an access category level less than the access category level of the document will not be able to view or view and edit the document. In another embodiment, the system may provide access to users with all access category levels but hide the portions of the document comprising a higher access category level than the user and still allow the sharing of the document. Such variations of limiting or blocking access to such information are further described herein and with respect to FIGS. 1C, 1D, and 1E.

For example, in one embodiment a user with an access category level of 4 may add an artifact with the same access category level to a collaboration document 133. Another user, at a different user device, with an access category level of 2 may be editing the same collaboration document 133, either concurrently or some time after the access category level 4 user added a new category level 4 artifact. From the perspective of the access category level 4 user, the artifact is completely viewable and editable in the document. From the perspective of the access category level 2 user, the same artifact may be completely hidden and unviewable in the document. Alternatively or in addition, from the perspective of the access category level 2 user, the same artifact may be hidden or unviewable, but at the location of the artifact is displayed an indicator that there is a hidden artifact. In some embodiments, the location of the hidden artifact is a placeholder element comprising no access category level 4 content but retaining the same size and shape as the original artifact. This allows the document to retain similar document formatting between the different users. Alternatively or in addition, from the perspective of the access category level 2 user, the same artifact may be partially viewable such that only the access category level 4 data is hidden from view.

The navigation pane 104 may further comprise an import button 106 allowing a user to import an object or other information into the document. Additionally, a user may import data or an object similar to the drag and drop method described in relation to the object explorer herein. The imported data may be stored and accessed according to FIG. 2.

The navigation pane 104 may further comprise an update button 106 allowing a user to update the document with any new information not already loaded into the document. In some embodiments, the document automatically updates in real-time as objects and documents are updated in the database. In other embodiments, to conserve processing power, a document is updated upon pressing the update button 106 where the system downloads updated object data and any other updated information linked to or referred to in the document. In other embodiments, the document may update all objects and information upon the opening of the document and may still require an update button 106 to refresh the page without closing and opening again.

The navigation pane 104 may further comprise a publish button 108 allowing a user to publish an object, the entire document, or a portion of the information into a document format viewable outside the system (for example, .doc, .docx, .xls, .pdf file, or any other format that allows the viewing of text and images).

The navigation pane 104 may further comprise a search box 112, drop down search box 114 and a search button 116. The search box 112 allows a user to enter an alpha-numeric string to search. In some embodiments, the user may be able to enter advanced search strings for more complex searching. The drop down search box 114 allows a user to review prior searches performed by the user. The user can click on one of the prior searches to run the prior search again. The search button 116 may be pressed after a search string is entered into the search box 112. Once pressed, the system processes the search and presents the user with the search results (not shown). In some embodiments, an advance searching window or pane may be accessible to the user to further modify the search criteria. In some embodiments, the all search results are presented to the user who entered the search. However, in other embodiments, the search results shown would be based on the access category levels of the user and each search result item (for example, an object or document) such that only objects or documents with the same or less secure access category level can be viewed or opened by the user. In some embodiments, objects or documents with more secure access category levels may appear but with an indicator (for example, grayed out) indicating to the user that the object or document is not viewable due to access category level restrictions, or for any other reason. In some embodiments, the search box 112 may include an autocomplete functionality allowing a user to begin typing and have possible results appear for the user to click on. Advantages would include assisting the user in spelling the remaining of the word, providing the results of common search terms, save the user time in entering the text, for example. In some embodiments, the autocomplete feature only displays possible results that are appropriate for the access category level of the user such that any data with a higher access category level is not displayed in the search or in the autocomplete results.

It should be appreciated that any button described herein may also be any other visual indicator that a user can interact with.

Settings Pane

In the collaboration document page 100 there may also be a settings pane 120 on the top of the interface. In some embodiments, the settings pane 120 may be located on the bottom or sides of the interface. In some embodiments the settings pane may be located at the top of the interface but below the navigation pane 104.

The settings pane 120 may comprise information useful to a user and options to edit, share, publish, or modify the document (for example, by appearance or style).

In some embodiments, the settings pane 120 may comprise a version indicator 118 describing the document's version type. In some embodiments, the version indicator 118 may comprise written text (for example, "draft," "version 2," or "final," or others). In some embodiments, the version indicator may comprise colors or shapes, or both, or any other way to indicate the version of the document.

In some embodiments, the settings pane 120 may comprise a folder path 122 describing a local or network location (which, in some implementations, may be virtual) of where an open document is saved. In some embodiments, if the document has not been saved in a location there may be a default or temporary location listed, or an option to save the file in a customized location. In a preferred embodiment, any document in viewed or edited in the collaboration document page 100 would be stored on a secure network drive and/or other data store (e.g., in cloud storage) and not on a local machine.

The settings pane 120 may also comprise a tool bar 124 section allowing the styling and formatting of text and images within the collaboration document page 100.

The settings pane 120 may also comprise a share option 126 allowing a user to share a link or copy of the current document open in the collaboration document page 100.

The settings pane 120 may also comprise a settings or option button 128 allowing a user to access general or specific options related to the collaboration document page 100.

The settings pane 120 may also comprise a publish button 128 allowing a user to access general or specific options related to the collaboration document page 100.

Collaboration Document

In a collaboration document page 100 there may be an open collaboration document 133. The collaboration document 133 is a document currently open and accessed by a user allowing interactions with text, images, and other elements on the page.

In some embodiments, the collaboration document 133 may comprise a document title 131, text, tagged objects (for example, 132 or 134), and various unique artifacts (for example, 136, 144, and 154). The document title 131 can be set or changes by a user to reflect a description of the collaboration document 133.

In some embodiments, a user may embed content via tagged objects 132 and 134 or artifacts 136, 144, and 154. In a preferred embodiment, the tagged objects 132 and 134 or artifacts 136, 144, and 154 are not stored locally but download the content when the page is loaded (or upon a particular event or time interval).

Figure 1B:
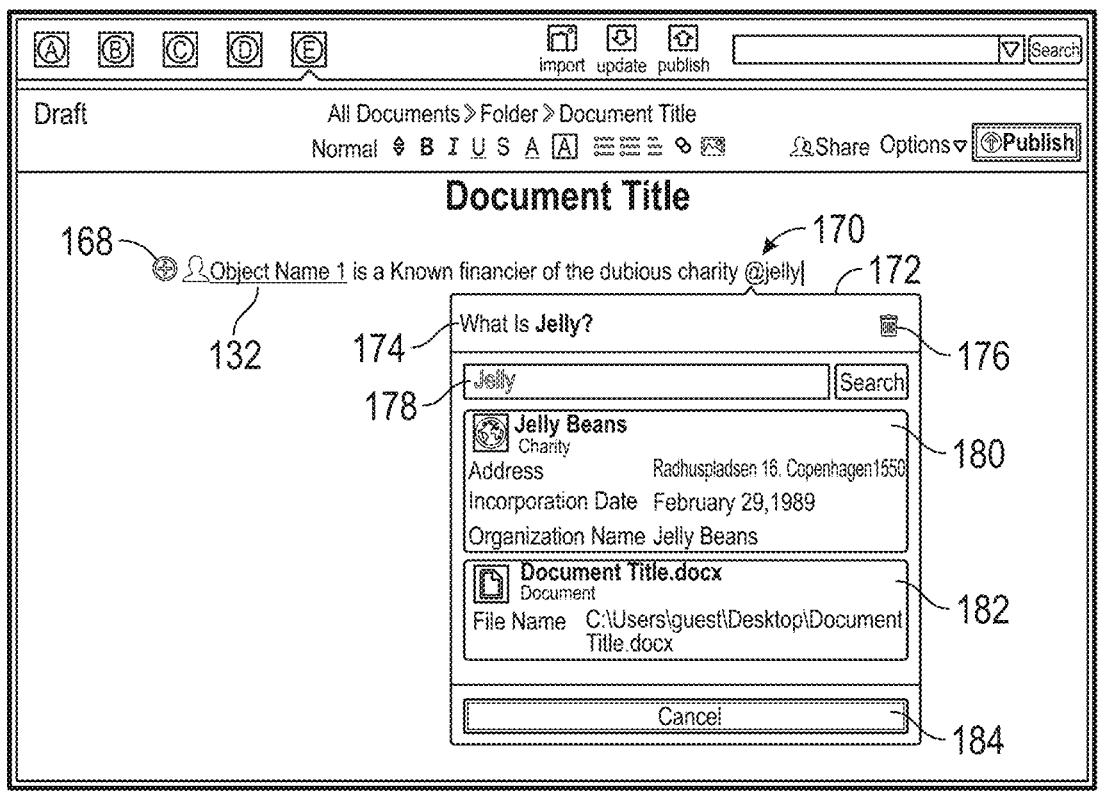

Turning to FIG. 1B, FIG. 1B shows another example of a collaboration page 101 similar to the collaboration page 100 shown in FIG. 1A. A user may add a tagged object 132 to a document. The tagged object 132 may be stored and accessed according to FIG. 2. In some embodiments, the tagged object 132 comprises a unique identifier. The tagged object 140 comprises a different unique identifier. The unique identifier points the collaboration document 133 to an object comprising one or more data elements stored remotely. On load, the collaboration document 133 downloads the necessary data to display in the collaboration document 133. In some embodiments, only the data the user wishes to display may be downloaded and then displayed. In other embodiments, all data may be downloaded and stored temporarily. Storing data remotely provides higher levels of security by allowing the remote server comprising the data to determine proper access category levels prior to sending any data over. Also, storing data remotely also allows updates to the data to be implemented in one location such that all documents linking to the one location will update together thereby avoiding issues of old or outdated information populating any documents. In some embodiments, updates to data in a collaboration document 133 may also update the source of the data in a remote database. Data appearing in the collaboration document that is linked to a database is referred to herein as "linked data," "database-linked," "data-linked," or in some cases a data object.

FIG. 1B shows a user adding a tagged object 170 and what may display to the user during the process. As shown, a box 172 may open offering a user options on adding the tagged object. For example, the box 172 may comprise a question or clarifying remark 174 to help the user select the correct information, a trash icon 176 to cancel or remove the addition, a search box 178 to search the remote database for additional information, various objects 180 and 182 in the database that comprise the searched term(s), and a cancel button 184 to cancel the creation process. In some embodiments, the box 172 may be displayed upon selection of an already created tagged object 132 or 140. In some embodiments, upon selection of either 180 or 182, another box may appear (not shown) allowing the user to choose how to display the object. The object may be displayed as 132 or alternatively as artifacts 136, 144, and 154 as shown on FIG. 1A. In some embodiments, the box 178 or search box 178 may include an autocomplete functionality allowing a user to begin typing and have possible results appear for the user to click on. Advantages would include assisting the user in spelling the remaining of the word, providing the results of common search terms, save the user time in entering the text, for example. In some embodiments, the autocomplete feature only displays possible results that are appropriate for the access category level of the user such that any data with a higher access category level is not displayed in the search or in the autocomplete results.

Turning back to FIG. 1A, there are various types of artifacts available to the collaboration document page 100. For example, one exemplary artifact, a person artifact 136, comprises data related to a person object in the database. The person artifact 136 comprises the object name 142 of the person, a classification of the object type 140, and information stored in the object, such as the birthday 138. In some embodiments, a user can choose which data fields to include in the person artifact 136 or which data fields to omit when the user creates the artifact.

Another exemplary artifact, a graph artifact 144, comprises a graph illustrating various data objects and their relationships to each other. In some embodiments, the graph artifact 144 comprises a graph title 142 and a link 146 to open the graph externally (for example in the graph page in the list of buttons 102). The graph may comprise various objects 148, each comprising a name and image associated with the object (if available in the database). In some embodiments, the data displayed in the graph may be customizable such that certain data is omitted and other data is displayed (for example as an optional feature, last known locations of the person objects may be displayed with an image of the person but names may be omitted due to a lack of consistent data or for any other reason). In some embodiments, lines may connect the objects 148 to show how particular objects are related or the relationship between the objects 148. For example, some lines may include text describing the relationship, such as "Managed By," "Known Associate," "Owned By," or "Brother To." Lines may also omit text and merely indicate a connection. Tagged objects 132 and 140 may also appear in the graph in addition to in-line with text.

Another exemplary artifact, a map artifact 154, comprises a map 166 of a particular location and, in some embodiments, events 160, 162, and 164 depicted on the map. In some embodiments, similar to the graph artifact 144, the map artifact 154 comprises a map title 158 and a link 156 to open the graph externally. In some embodiments, users can customize how the map 166 is depicted such that certain countries, cities, or borders may be emphasized or de-emphasized. Moreover, one or more events may be added to the map, for example events 160, 162, and 164.

The collaboration document 133 may also comprise an interactive button 168 allowing a user to click the button and view additional options related to embedding or modifying content. These options are described in FIG. 1C.

In some embodiments, it is possible to create an artifact by selecting the interactive button 168, which may include an option to add an artifact to a collaboration document 133. There are many ways to add an artifact to a collaboration document 133. In one embodiment, a user may input information into a popup or within the document itself, similar to box 172 in FIG. 1B. Information may depend on the following: the type of artifact being added, the settings pertaining to the artifact's appearance, custom requirements previously set up for the collaboration document, the account, the particular artifact, or the particular one or more objects appearing in the artifact.

In another embodiment, a user may drag an object onto the collaboration document button 102 from another page listed on the buttons 102. Upon dragging the object onto the page, one of the following options may occur: a default object artifact may be created at the bottom of the collaboration document 133, a popup box occurs, similar to box 172 in FIG. 1B described above, requesting or requiring information to be entered related to the creation of the artifact, or a combination of the two. In some embodiments, the functionality of dragging and dropping the object may be pre-programmed by an administrator for some or all objects and settings. In one embodiment, the user may drag an object onto the collaboration page button 102 and continue to hold the object and drag it onto a place on the collaboration document page 133. Upon dropping the object in the collaboration document 133, the system may display a preprogrammed default artifact based on the object type dropped in the collaboration document 133. Alternatively or in addition, upon dropping the object in the collaboration document 133, the system may prompt the user for information related to the display of the artifact prior to displaying the artifact. In some embodiments, the popup box may include an autocomplete functionality allowing a user to begin typing and have possible results appear for the user to click on. Advantages such functionality may include assisting the user in spelling the remainder of the word or phrase, or providing the results of common search terms, which may save the user time in entering the text, for example. In some embodiments, the autocomplete feature displays possible results that are appropriate for the access category level of the user such that any data with a higher access category level is not displayed in the search or in the autocomplete results.

In some embodiments, when a user indicates to the system that the user wants to input an artifact (for example by selecting the interactive button 168 or dragging and dropping an object onto the page), the system may either use information input by the user, preprogrammed information, or a combination of both to create the artifact. This information would indicate to the system the format, layout, size, and/or organization of the artifact as it is displayed in the collaboration document 133. In one embodiment, only the necessary information required to display the artifact that is already not preprogrammed or accessible by the system would be requested directly from the user prior to generating or displaying the artifact.

Access Category Level Controls

Access category levels stored for each user and object provide the system a way to compare a user with an object, an object with another object, or a user with another user. By comparing the users and objects, the system can make a determination to either display an object to a user or restrict access to the object. Based on preprogrammed criteria on how the access categories relate to one another, the system, after it makes the determination, will implement the appropriate means to either provide or prevent access to the object, or information associated with the object.

Figure 1C:
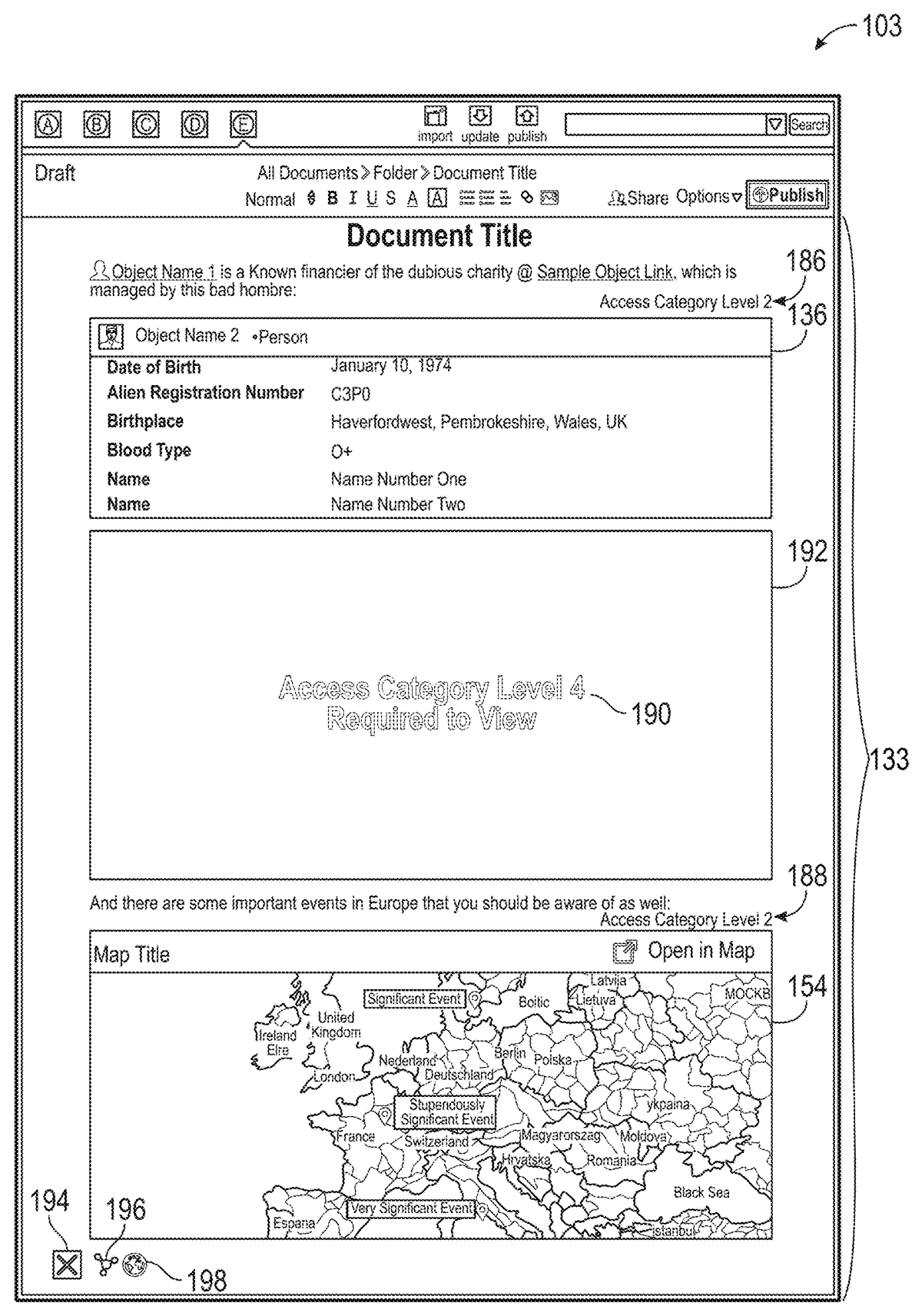

Similar to FIG. 1A, FIG. 1C illustrates another example of a collaboration page 103 similar to the collaboration page 100 shown in FIG. 1A. FIG. 1C also illustrates one embodiment of the access category levels implemented by the system. In this embodiment, the graph artifact 144 is hidden based on the system's determination that the user accessing the collaboration document 133 does not have the appropriate access category level. Although it is optional, the system may display a placeholder artifact 192. The placeholder artifact 192 retains the similar or same size and shape of the graph artifact 144 in the collaboration document 133 so that the format and appearance of the document 133 may be similar to that of the original document except without the sensitive content. In some embodiments, there is an indicator 190 displayed to the user indicating that a particular artifact is hidden from view. In some embodiments, the indicator 190 also displays the required access category level so that the user may know who has access to the information, or how secure the information is. The indicator 190 may be displayed without the placeholder artifact 192 anywhere on the user interface (for example, the top, sides, bottom of the collaboration document 133, in a location where the sensitive content would appear but not in a placeholder artifact, or anywhere else that a user may reference).

In some embodiment, an access category level tag 186 and 188 may be displayed by some or all artifacts in the collaboration document 133. For example, access category level tag 186 read "Access Category Level 2" and is displayed near or next to the person artifact 136. Another example, access category level tag 188 also reads "Access Category Level 2" and is displayed near or next to the map artifact 154. The access category level displayed near each artifact should be the same access category level that appears in the database for the artifact, or the data, depending on the system's configuration. So, depending on how the system is configured, the artifact may inherit the most restrictive or least restrictive access category level of all data within the artifact.

In another embodiment, data within the objects may be removed or hidden from view based on the system's determination that the user does not have the required access category level. For example, in the person artifact 136, a particular data element, such as "Family Members" may not be displayed if the system determines that the "Family Members" data is has a higher access category level than the user. In another embodiment, a row may still be displayed showing the title of the data, for example "Family Members," but indicating that the data is restricted or blocked from view due to access category level restrictions. This indication may be provided similar to the indicator 190 as described above.

FIG. 1C also illustrates what happens when a user selects or clicks on the interactive button 168 that is shown on FIGS. 1A and 1B. Once the user selects the interactive button 168, several options may appear. The new options are also selectable. The first option, the cancel option 194, allows a user to cancel the selection of the interactive button 168, and hide the newly displays options (for example, 196 and 198). One example of an option would be a graph option 196, allowing a quick shortcut to create a graph artifact, similar to the graph artifact 144. Another option may be a map option 198, allowing a quick shortcut to create a map artifact, similar to the map artifact 154. In some embodiments, there can be any number of options available to a user based on the system's configuration, the data available, or any custom user or organization preferences.

Figure 1D:
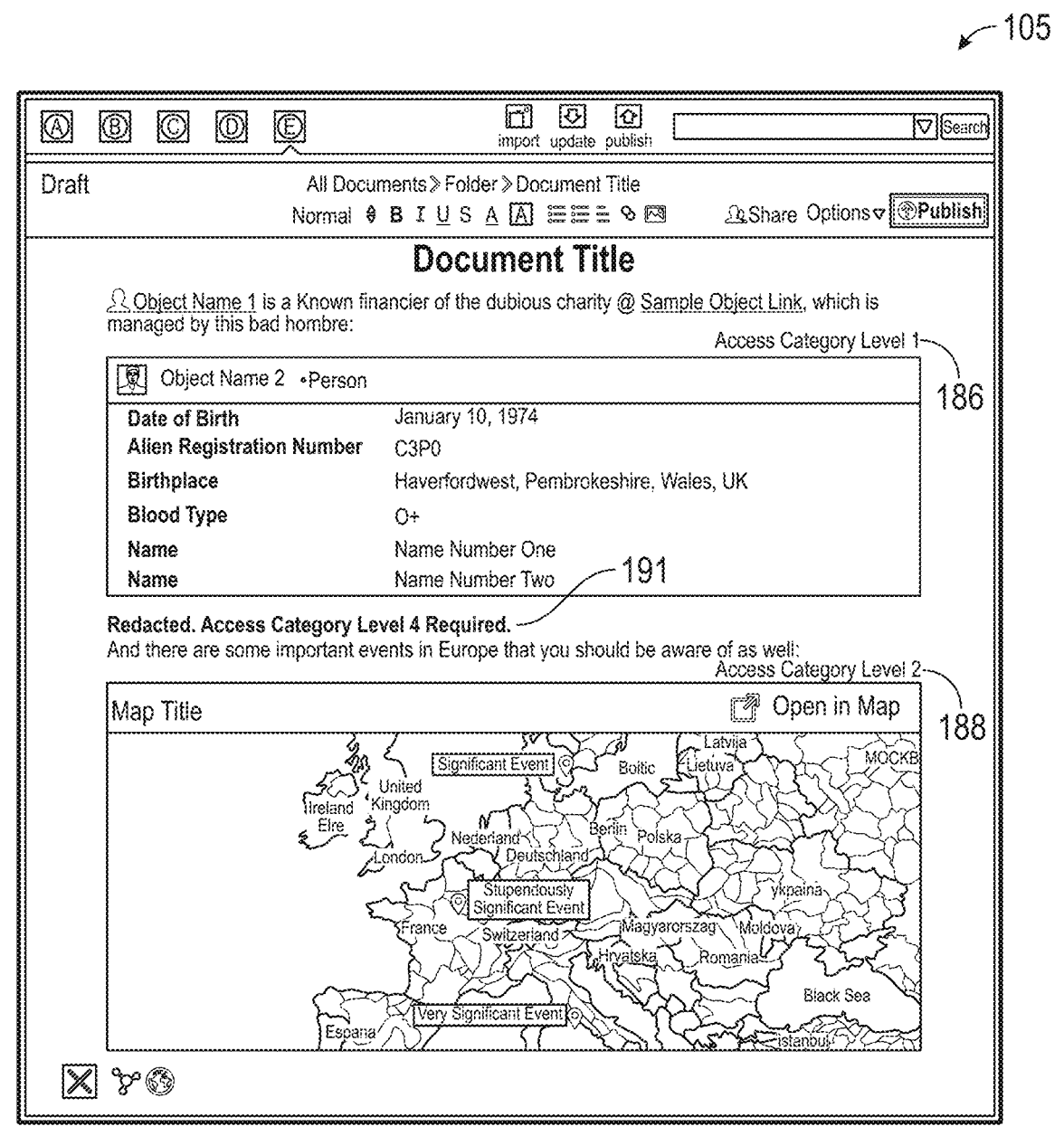

Similar to FIG. 1C, FIG. 1D illustrates another example of a collaboration page 105 similar to the collaboration page 103 shown in FIG. 1C showing another example implementation of the category access levels. In this embodiment, the graph artifact 144 is completely hidden based on the system's determination that the user accessing the collaboration document 133 does not have the appropriate access category level. Unlike FIG. 1C, there is no placeholder artifact, but instead there is written text 191 indicating that content was located in this line, that the content is restricted, and the access category level required. In some embodiments, there could be no text displayed in line, no access category level requirement, or both. In other embodiments, the text can appear anywhere else on the screen indicating that content was hidden and/or the access category level required to view all content.

Also, as described in FIG. 1C, in some embodiments, an access category level tag 186 and 188 may be displayed by some or all artifacts in the collaboration document 133.

Figure 1E:
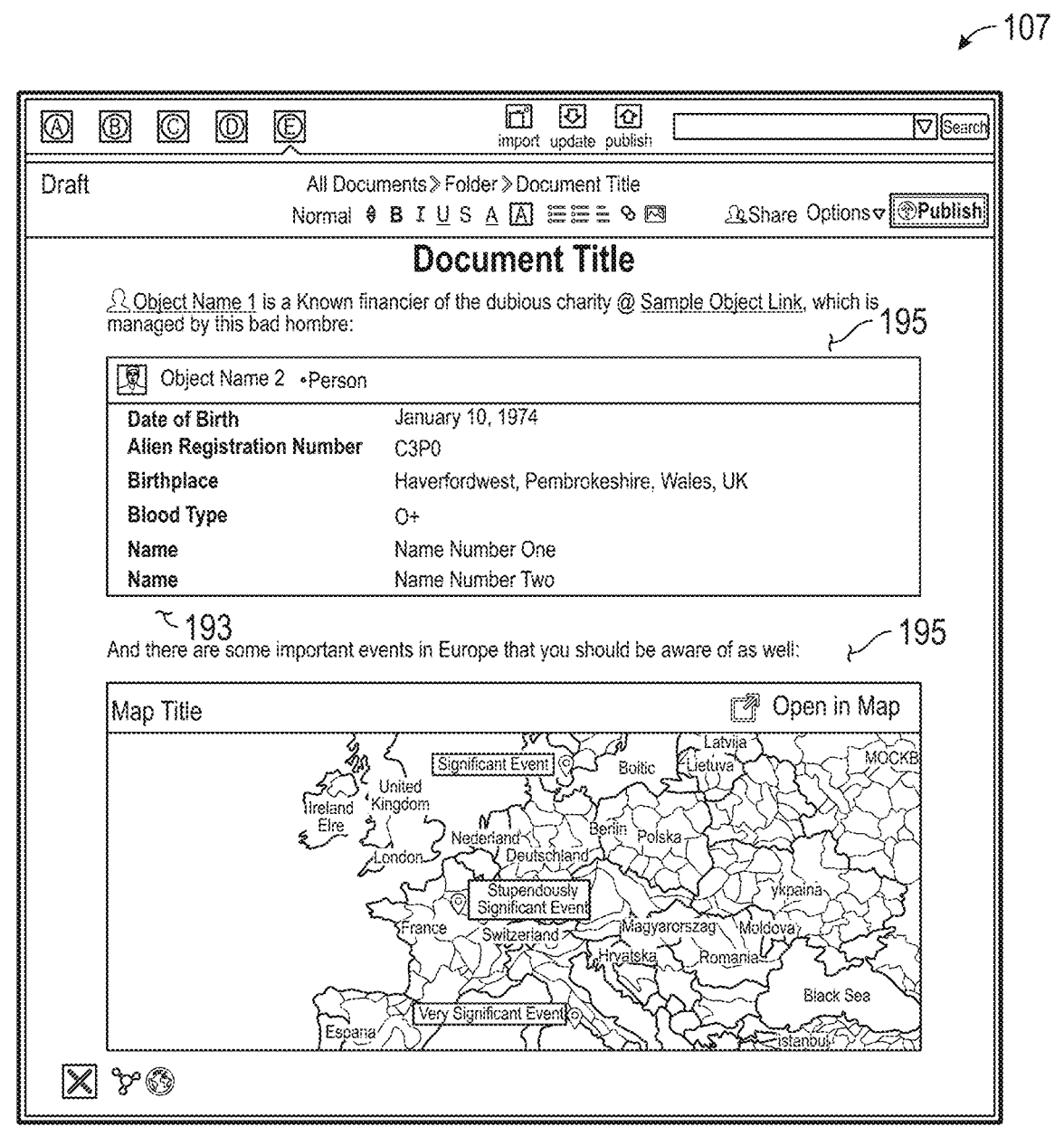

Similar to FIGS. 1C and 1D, FIG. 1E illustrates another example of a collaboration page 107 similar to the collaboration page 103 shown in FIG. 1C showing another example implementation of the category access levels. In this embodiment, the graph artifact 144 and any written text 191 are completely hidden based on the system's determination that the user accessing the collaboration document 133 does not have the appropriate access category level. Unlike FIGS. 1C and 1D, there is no placeholder artifact or written text 191 indicating that content was located in a particular line that the content is restricted, or the access category level required. Also, in some embodiments, there can be no indication of access category level near any artifact (for example, 195 shows that access category level tags 186 and 188 have been omitted). In other embodiments, similar to FIG. 1D, text indicating that content was hidden, redacted, or restricted can appear anywhere else on the screen indicating that content was hidden and/or the access category level required to view all content. Also, in other embodiments, a user or administrator may toggle the settings such that access category levels may be displayed.

For example, a report document may have a paragraph that has a higher categorization than the rest of the paragraphs. The report document may be released at a lower categorization level that excludes the higher-categorized paragraph from showing up, which means content from the report document will be missing. The system may have a preview feature that allows a user to view how that report document would look if released at various categorization levels, in order to ensure that the report document transitions and flows smoothly despite certain content being excluded.

In another embodiment, the system may filter and present only the text in the report document that is of a certain categorization level (for example, with the categorization level chosen through a drop-down menu via a pop-up). Upon selecting the desired categorization level manually and clicking "redact" (or automatically as described herein), the filtered version of the collaboration document is presented to the user based on the user's access category level. In one embodiment, certain data is hidden to all users and must be accessed by selecting a button or text indicating more content is viewable and having the appropriate access category level to view the information.

In another embodiment, a collaboration document may be saved and opened by a second user. In some embodiments, an optional feature may be implemented to require the second user to input credentials to access the collaboration document. The second user can, in the electronic visualization interface, click on quoted passages or cited sources created by the original author. If the second user is authorized, the system can then automatically retrieve the sources without requiring further manual interaction from the second user and display the information to the user. In another embodiment, the second user can access the collaboration document while the first user still has the document open.

In one embodiment, a collaboration document can be saved to a workspace in the database. Documents in the workspace can be accessed by other users who are authorized to access the workspace. Documents in the workspace can be linked together through citations. For example, a first report can cite to a second report, which may cite to a source in a workspace. The system can automatically link the first report to the source, or provide the source for viewing when a user clicks on the citation in the first report. Similarly, sources of sources within a workspace can be linked. This way, a network of citations can be constructed within the workspace, enabling additional features, such as finding the most commonly cited sources or authors. In some embodiments, the system keeps track of all access category levels of the data so that any user accessing such documents will still only view information appropriate for the user's access category level (for example, the user has either the same or higher access category level), so that even if higher access category level data is a source of a source the user is trying to view the system will omit or redact it per the methods described herein.

Figure 1F:
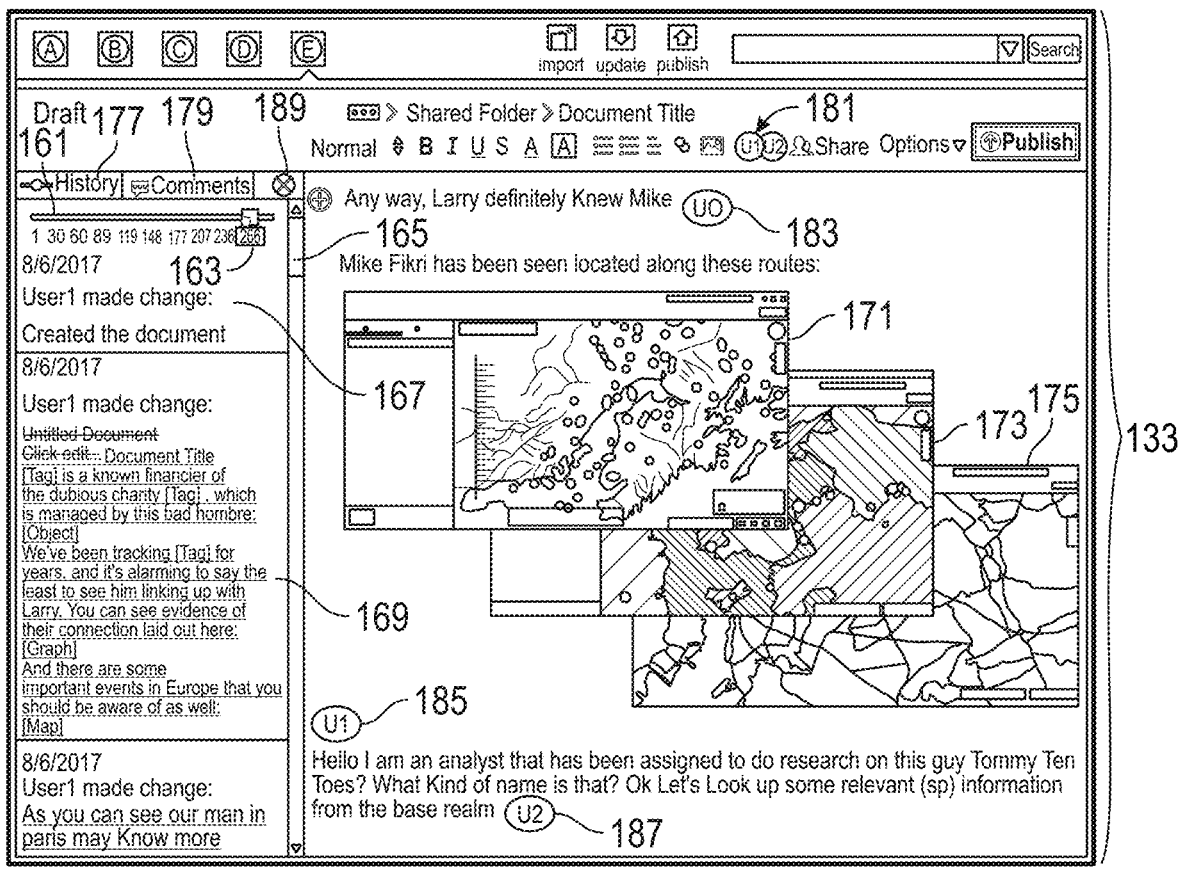
FIG. 1F, similar to FIGS. 1A-1E, illustrates an embodiment of a graphical user interface being accessed by at least three users at the same time, and a column allowing a user to view modifications and edits done to the document by each user.

FIG. 1F, similar to FIGS. 1A-1E, illustrates an embodiment of a system graphical user interface 109 being accessed by at least three users at the same time, and a column allowing a user to view modifications and edits done to the document by each user.

With respect to the multiple users, user access information button 181 may be displayed on the screen indicating to a user what other users are accessing or editing the document. The user may hover over or select the user access information button 181 to get more details on the users accessing the document. Such details may include one or more of the following: abbreviated initials or code (for example "U0" or "U1"), full name, user name, time in document, contact information (for example, email or phone number), methods to privately communicate (for example, through a chat or quickly sending an email), or any other useful information.

In some embodiments, there may be a cursors or indicators 183, 185, and 187 located on the screen indicating where each user currently accessing the document has his or her cursor. This allows each user the ability to avoid editing or modifying text or artifacts currently being edited by another user to improve collaboration efforts. In some embodiments, the user accessing the page may also have his or her cursor displayed as the user's abbreviated initials or code (for example, 183). In other embodiments, the user's cursor may appear to the user as a flashing vertical line as it appears in other word processing software, but appear as the user's abbreviated initials or code 183 to every other user accessing the document.

In some embodiments, map artifacts 171, 173, and 175 showing different types of information (for example, heat maps, elevation maps, street maps, earth views, or any other type of map) may be displayed in the map artifact 154, as shown at least in FIG. 1A. Also, in some embodiments, such artifacts 171, 173, and 175 may overlap to save space. It should be appreciated that any artifact may be configured to overlap with another artifact in all FIGS. 1A to 1F. In some embodiments, a user may interact with an overlapped artifact (for example, map artifacts 173 or 175) and the artifact may be raised to appear over the overlapping artifacts (for example, map artifact 173 would appear to now overlap map artifacts 171 and continue to overlap map artifact 175).

In some embodiments, a history pane 177 may be displayed allowing a user access to document changes tracked in the system. There may be a comments section 179 allowing users the ability to view and add comments to various portions content added to the document, or to other comments. A cancel button 189 may also appear to allow the user the ability to close the history pane 177. In some embodiments, the history pane 177 may take up the whole screen. In some embodiments, a cancel button 189 may not be required and a user may be able to close the screen with a shortcut or clicking the title bar. It should be appreciated that any user interface pane disclosed herein may have similar features.

In some embodiments, the history pane 177 may also include a timeline feature 161. The timeline feature 161 allows a user to step back and step forward through the tracked changes in a document. As the user steps back or steps forward, the collaboration document 133 may update according to the step the user indicates. In some embodiments, there may be a slider 163 in the timeline feature 161, allowing a user to slide the slider 163 back and forth along a path to select various steps in the tracked changes.

In some embodiments, the tracked changes may also be listed in order (for example, by time, by user name, by type of change, or anything else that may be useful). One example tracked change 167 lists a date "8/6/2017," a username "User1," and a tracked change that the user "Created the document." Other example changes are also listed, for example 169, which appears in FIG. 1A.

With respect to FIGS. 1A-1F and the embodiments described herein, it should be appreciated that the collaboration document 133 may comprise many elements, components, and features, many of which are not shown or described herein. An exemplary set of features are described, but the list is not meant to be exhaustive but to provide varying examples of the system's capabilities. It can be appreciated that many other features can be included in the system. For example, in FIGS. 1A-1F, a user or administrator may toggle the settings such that any embodiment regarding access category levels described in the figures may be implemented, and to any degree such that a user may view any number of indicators (for example, placeholder artifacts, written text, or anything else described herein or obvious variations of what is described herein).

With respect to FIGS. 1A-1F and the embodiments described herein, it should also be appreciated that in some embodiments, the text associated with an artifact that is hidden from a particular user may also be desired to be hidden and the system may provide options to users to categorize particular text, data, or artifacts a specific customized access category level absent of any programmed access category level in the database or system.

Object-Centric Data Model

To provide a framework for the following and above discussions of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
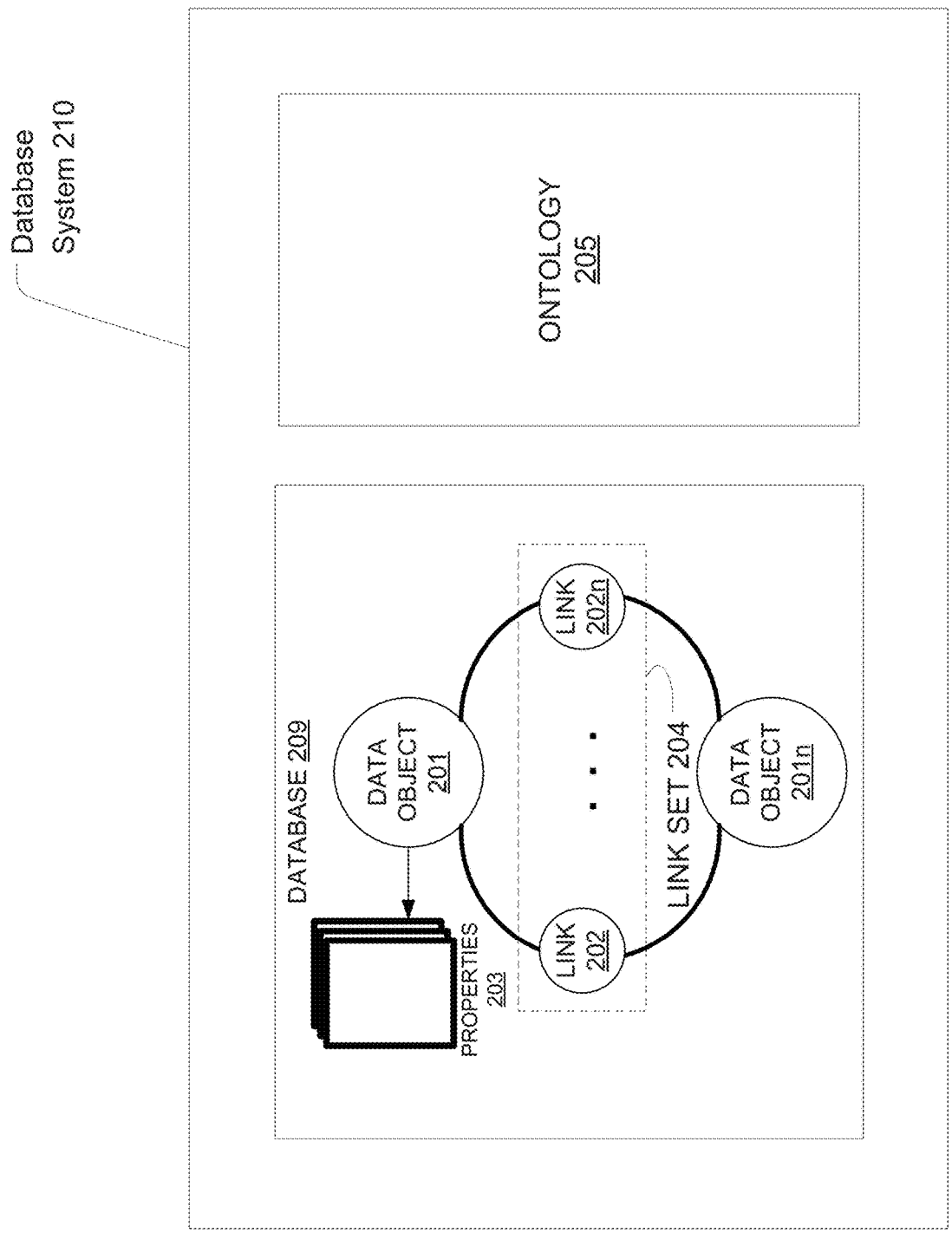
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on 3/27/2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
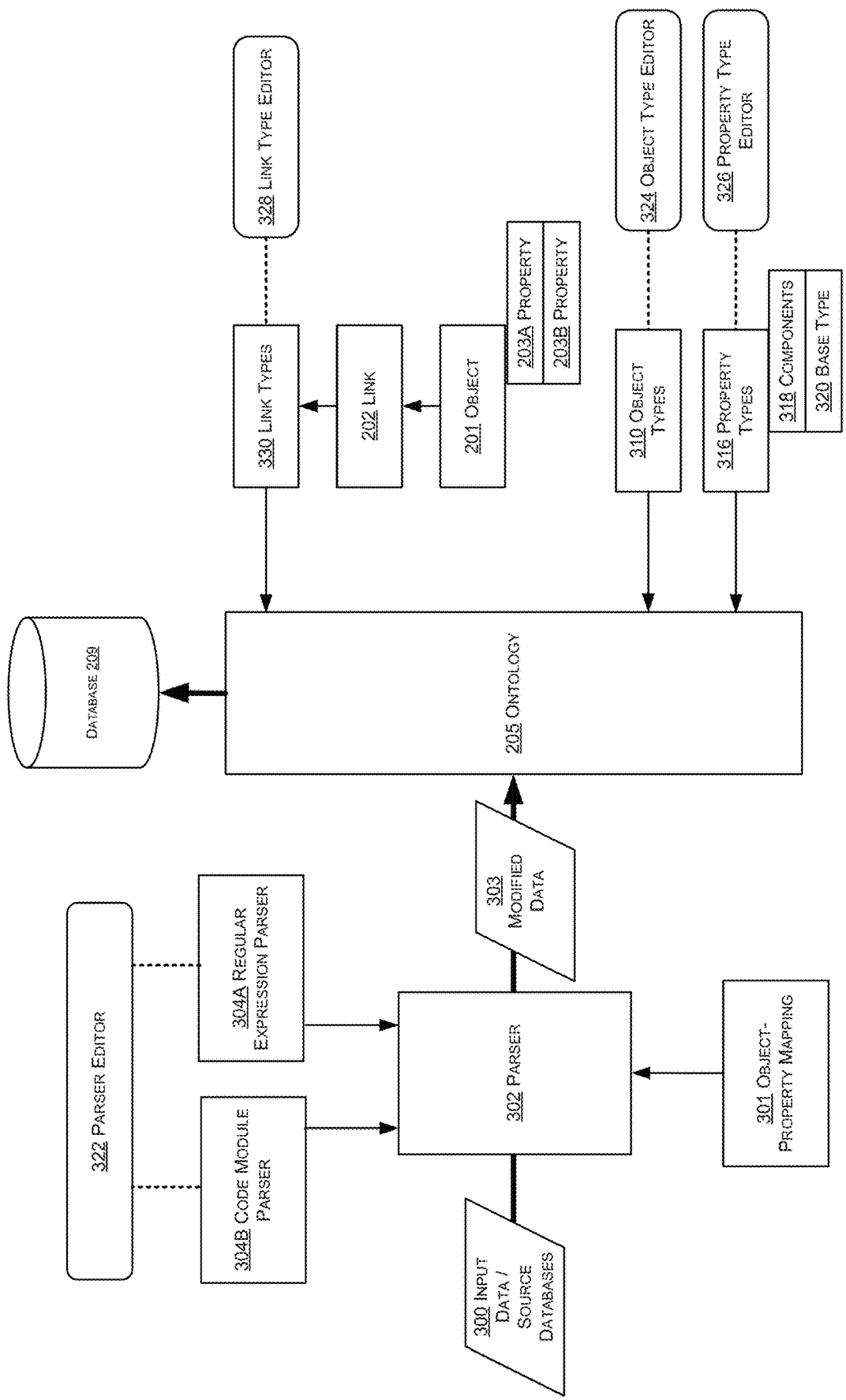
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

The properties, objects, and links (e.g. relationships) between the objects can be visualized using a graphical user interface (GUI). For example, FIG. 4 displays a user interface showing a graph representation 403 of relationships (including relationships and/or links 404, 405, 406, 407, 408, 409, 410, 411, 412, and 413) between the data objects (including data objects 421, 422, 423, 424, 425, 426, 427, 428, and 429) that are represented as nodes in the example of FIG. 4. The graph artifact 144 in FIG. 1 is one example of a graph representation 403 described herein. In this embodiment, the data objects include person objects 421, 422, 423, 424, 425, and 426; a flight object 427; a financial account 428; and a computer object 429. In this example, each person node (associated with person data objects), flight node (associated with flight data objects), financial account node (associated with financial account data objects), and computer node (associated with computer data objects) may have relationships and/or links with any of the other nodes through, for example, other objects such as payment objects.

Figure 4:
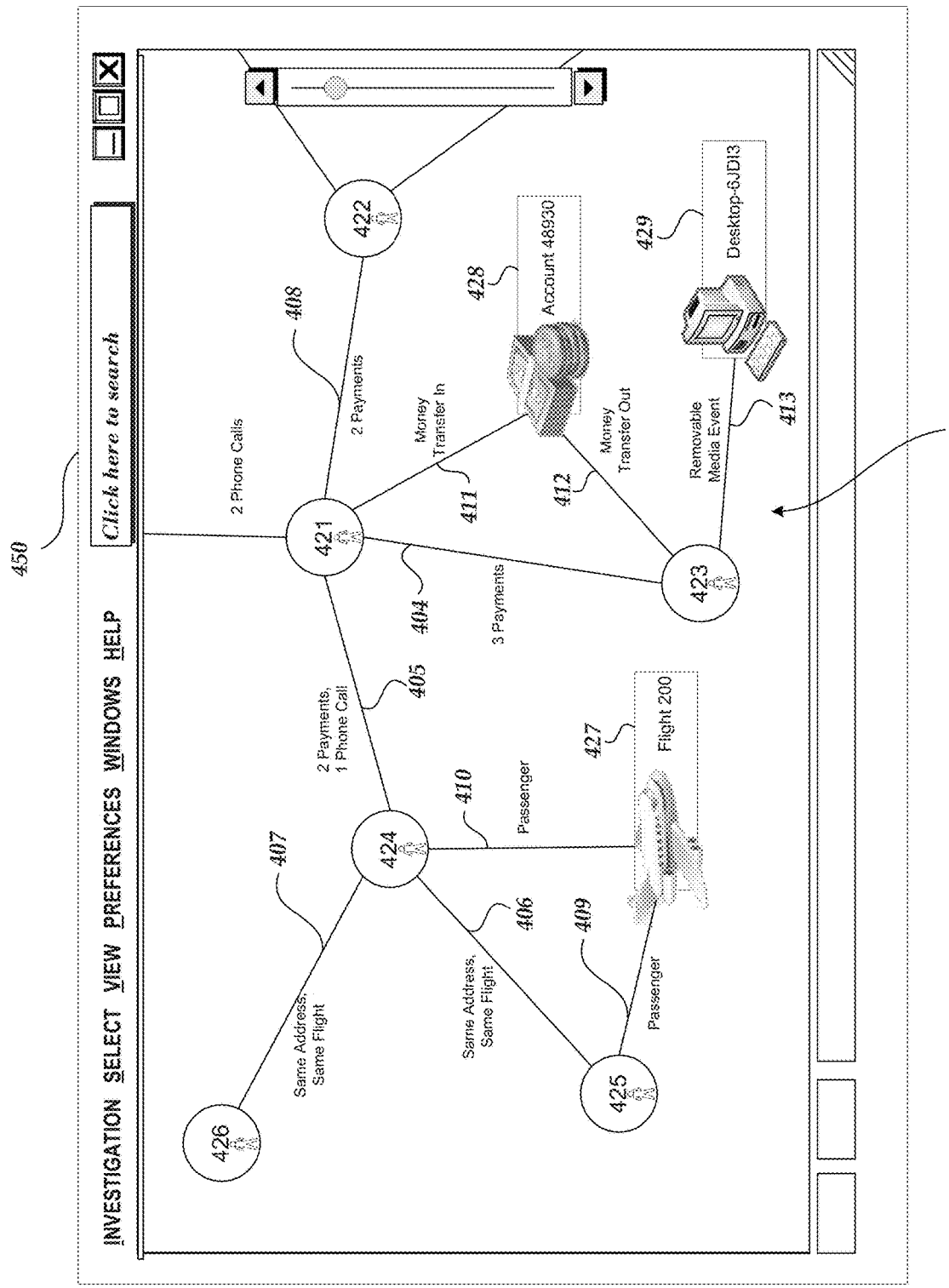
FIG. 4 illustrates a sample user interface using relationships described in a data store using a dynamic ontology.

For example, in FIG. 4, relationship 404 is based on a payment associated with the individuals indicated in person data objects 421 and 423. The link 404 represents these shared payments (for example, the individual associated with data object 421 may have paid the individual associated with data object 423 on three occasions). The relationship is further indicated by the common relationship between person data objects 421 and 423 and financial account data object 428. For example, link 411 indicates that person data object 421 transferred money into financial account data object 428, while person data object 423 transferred money out of financial account data object 428. In another example, the relationships between person data objects 424 and 425 and flight data object 427 are indicated by links 406, 409, and 410. In this example, person data objects 424 and 425 have a common address and were passengers on the same flight data object 427. In an embodiment, further details related to the relationships between the various objects may be displayed. For example, links 411 and 412 may, in some embodiments, indicate the timing of the respective money transfers. In another example, the time of the flight associated with the flight data object 427 may be shown.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 108 may be searched using a search interface 450 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, the present disclosure allows users to interact and analyze electronic data in a more analytically useful way. Graphical user interfaces allow the user to visualize otherwise obscure relationships and patterns between different data objects. The present disclosure allows for greater scalability by allowing greater access and search capabilities regardless of size. Without using the present disclosure, observation and use of such relationships would be virtually impossible given the size and diversity of many users' present databases, (e.g. excel spreadsheets, emails, and word documents).

Figure 5:
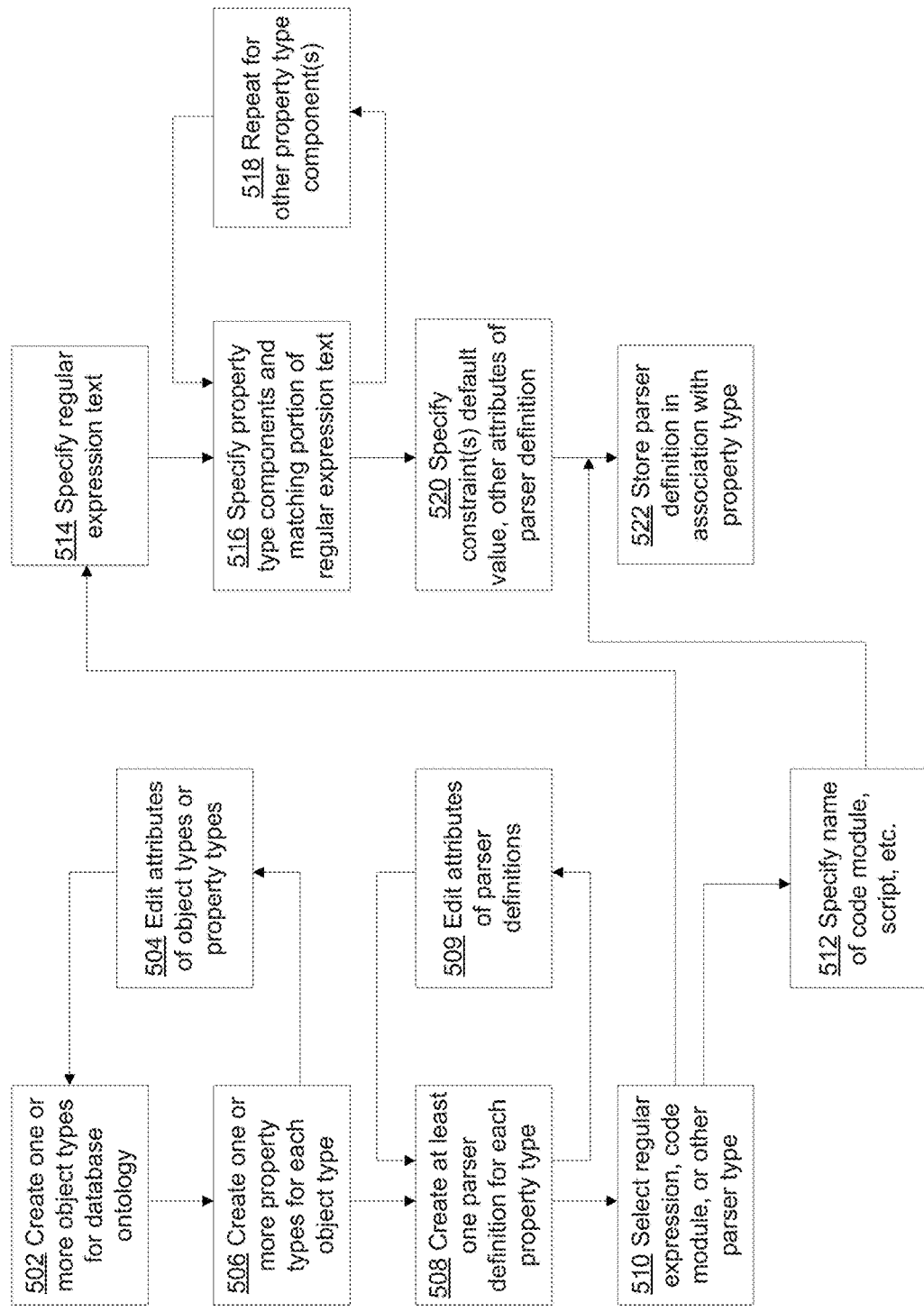
FIG. 5 illustrates defining a dynamic ontology for use in creating data in a data store.

FIG. 5 illustrates defining a dynamic ontology for use in creating data in a database. For purposes of illustrating a clear example, steps 502-509 of FIG. 5 are first described at a high level, and details of an example implementation follow the high level description.

In step 502, one or more object types are created for a database ontology. In step 506, one or more property types are created for each object type. As indicated in step 504, the attributes of object types or property types of the ontology may be edited or modified at any time.

In step 508, at least one parser definition is created for each property type. At step 509, attributes of a parser definition may be edited or modified at any time.

In an embodiment, each property type is declared to be representative of one or more object types. A property type is representative of an object type when the property type is intuitively associated with the object type. For example, a property type of "Social Security Number" may be representative of an object type "Person" but not representative of an object type "Business."

In an embodiment, each property type has one or more components and a base type. In an embodiment, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane". An example parser definition specifies an association of input data to object property components as follows: {LAST_NAME}, {FIRST_NAME}→Name:Last, Name:First. In an embodiment, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane". The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

In an embodiment, administrative users use an administrative editor to create or edit object types and property types. In an embodiment, users use the administrative editor to specify parser definitions and to associate regular expressions, code modules or scripts with the parser definitions. In the administrative editor, a user can specify attributes and components of a property type. For example, in one embodiment a user specifies a graphical user interface icon that is associated with the property type and displayed in a user interface for selecting the property type. The user further specifies a parser definition that is associated with the property type and that can parse input data and map the input data to properties corresponding to the property type. The user further specifies a display format for the property type indicating how users will see properties of that property type.

In an embodiment, an object type editor panel could comprise graphical buttons for selecting add, delete, and edit functions, and one or more rows that identify object types and a summary of selected attributes of the object types. Example selected attributes that can be displayed in object editor panel include an object type name (e.g., Business, Asset, etc.), a uniform resource identifier (URI) specifying a location of information defining the object type (for example, "com.business_entity_name.object.business"), and a base type of the object type, also expressed in URI format (for example, "com.business_entity_name.object.entity"). Each URI also may include a graphical icon.

In an embodiment, a user interacts with a computer to perform the following steps to define an object type. Assume for purposes of an example that the new object type is Vehicle. Using the object type editor, the user selects the "Add Object Type" button and the computer generates and displays a panel that prompts the user to enter values for a new object type. The user selects a base object type of Entity, which may comprise any person, place or thing. The user assigns a graphical icon to the Vehicle object type. The user assigns a display name of "Vehicle" to the object type.

In an embodiment, a user interacts with the computer to define a property type in a similar manner. The user specifies a name for the property type, a display name, and an icon. The user may specify one or more validators for a property type. Each validator may comprise a regular expression that input data modified by a parser must match to constitute valid data for that property type. In an embodiment, each validator is applied to input data before a process can store the modified input data in an object property of the associated property type. Validators are applied after parsing and before input data is allowed to be stored in an object property.

In various embodiments, validators may comprise regular expressions, a set of fixed values, or a code module. For example, a property type that is a number may have a validator comprising a regular expression that matches digits 0 to 9. As another example, a property type that is a US state may have a validator that comprises the set {AK, AL, CA . . . VA} of valid two-letter postal abbreviations for states. Validator sets may be extendible to allow a user to add further values. A property type may have component elements, and each component element may have a different validator. For example, a property type of "Address" may comprise as components "City", "State", and "ZIP", each of which may have a different validator.

In an embodiment, defining a property type includes identifying one or more associated words for the property type. The associated words support search functions in large database systems. For example, a property type of "Address" may have an associated word of "home" so that a search in the system for "home" properties will yield "Address" as one result.

In an embodiment, defining a property type includes identifying a display formatter for the property type. A display formatter specifies how to print or display a property type value.

In an embodiment, the parser definitions each include a regular expression that matches valid input, and the parser uses a regular expression processing module. For example, conventional Java language processors typically have regular expression processing modules built in. In an embodiment, parser definitions comprising regular expressions may be chained together. In another embodiment, one or more of the parser definitions each include a code module that contains logic for parsing input data and determining whether the input data matches a specified syntax or data model. The code module may be written in Java, JavaScript, or any other suitable source language.

In an embodiment, there may be any number of parser definitions and sub-definitions. The number of parser definitions is unimportant because the input data is applied successively to each parser definition until a match occurs. When a match occurs, the input data is mapped using the parser sub definitions to one or more components of an instance of an object property. As a result, input data can vary syntactically from a desired syntax but correct data values are mapped into correct object property values in a database.

Accordingly, referring again to FIG. 5, creating a parser definition for a property type at step 508 may comprise selecting a parser type such as a regular expression, code module, or other parser type. When the parser type is "code module," then a user specifies the name of a particular code module, script, or other functional element that can perform parsing for the associated property type.

In an embodiment, defining a property type includes creating a definition of a parser for the property type using a parser editor. In an embodiment, a screen display comprises a Parser Type combo box that can receive a user selection of a parser type, such as "Regular Expression" or "Code Module." A screen display further comprises a Name text entry box that can receive a user-specified name for the parser definition.

When the parser type is "regular expression," steps 514-520 are performed. At step 514, regular expression text is specified. For example, when the Parser Type value of combo box is "Regular Expression," a screen display comprises an Expression Pattern text box that can receive a user entry of regular expression pattern text.

In step 516, a property type component and a matching sub-definition of regular expression text is specified. For example, a screen display further comprises one or more property type component mappings. Each property type component mapping associates a sub-definition of the regular expression pattern text with the property type component that is shown in a combo box. A user specifies a property type component by selecting a property type component using a combo box for an associated sub-definition. As shown in step 518, specifying a property type component and sub-definition of regular expression text may be repeated for all other property type components of a particular property type.

In step 520, a user may specify one or more constraints, default values, and/or other attributes of a parser definition. The user also may specify that a match to a particular property type component is not required by checking a "Not Required" check box. A screen display may further comprise a Default Value text box that can receive user input for a default value for the property type component. If a Default Value is specified, then the associated property type receives that value if no match occurs for associated grouping of the regular expression. In alternative embodiments, other constraints may be specified.

At step 522, the parser definition is stored in association with a property type. For example, selecting the SAVE button causes storing a parser definition based on the values entered in screen display. Parser definitions may be stored in database 209.

The approach of FIG. 5 may be implemented using other mechanisms for creating and specifying the values and elements identified in FIG. 5, and a particular GUI of is not required.

Advantageously, use of a dynamic ontology may allow a user to take advantage of an ontological data model, while not constraining himself or herself to a hard-coded ontology. Hard-coded ontologies can be overly simple (i.e. lacking detailed semantic properties, making classification difficult but limiting analysis) or overly complex (i.e. having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.).

Advantageously, use of a parser or other ontology configuration tools may allow greater scalability of a user's database without loss of any analytic ability. Use of a parser or other ontology configuration tools and parser definitions, (e.g., first name, last name, etc.), may allow for self-categorization without the need for manual coding. Manual coding of a data object's properties may be subject to many of the disadvantages associated with manual data entry (e.g., slow, inaccurate, and costly). Additionally, manual coding of a data object's properties may not allow for dynamic ontology reconfiguration if a user chose to adjust the granularity, (i.e., specificity), or an ontologies semantic properties.

Figure 6:
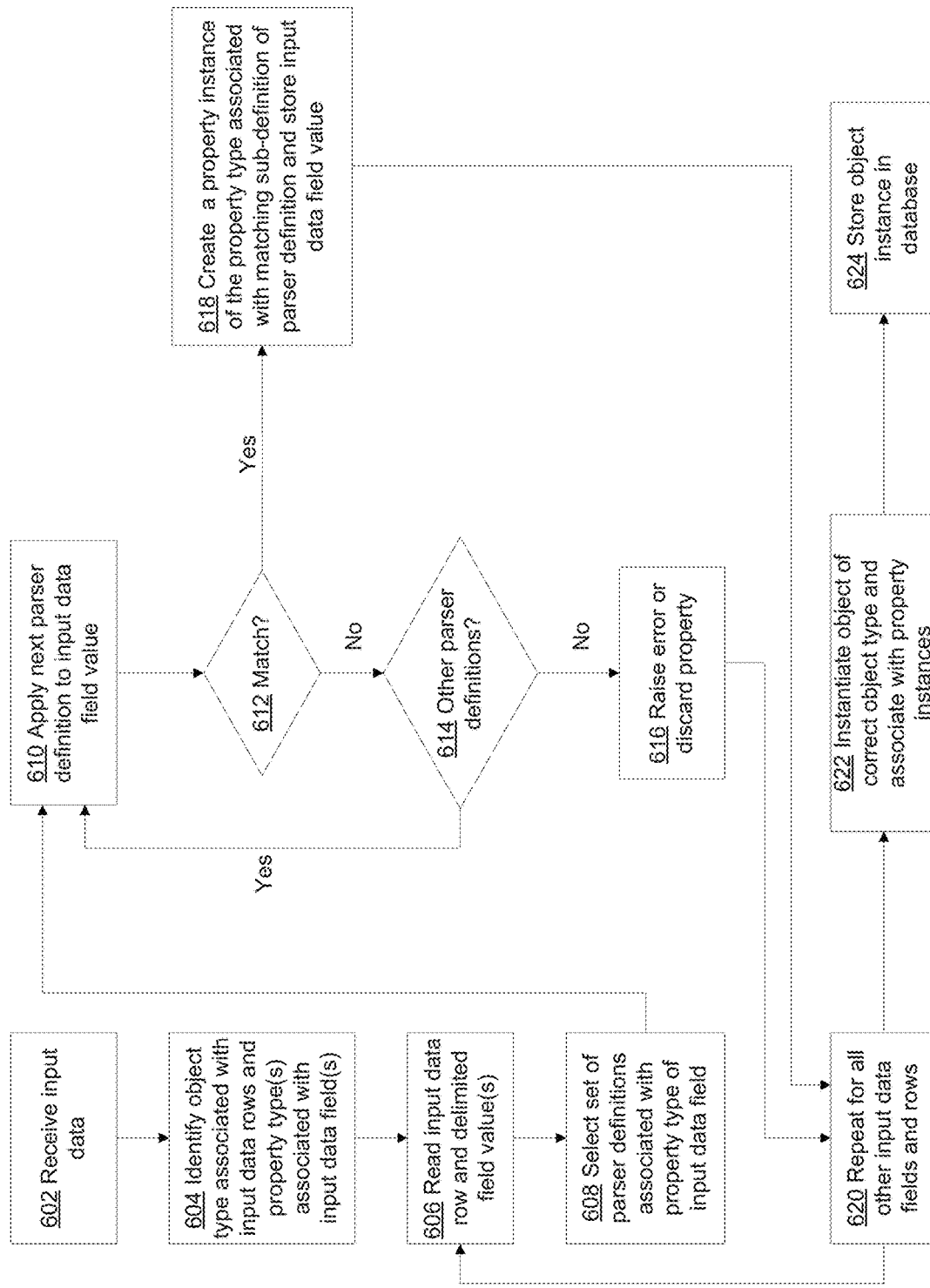
FIG. 6 illustrates a method of transforming data and creating the data in a data store using a dynamic ontology.

FIG. 6 illustrates a method of transforming data and creating the data in a database using a dynamic ontology. For purposes of illustrating a clear example, the approach of FIG. 6 is described herein with reference to FIG. 3. However, the approach of FIG. 6 may be implemented using other mechanisms for performing the functional steps of FIG. 6, and the particular system of FIG. 3 is not required.

In step 602, input data is received. In an embodiment, an input data file is received. The input data file may comprise a comma-separated value (CSV) file, a spreadsheet, XML or other input data file format. Input data 300 of FIG. 3 may represent such file formats or any other form of input data.

In step 604, an object type associated with input data rows of the input data is identified, and one or more property types associated with input data fields of the input data are identified. For example, the object-property mapping 301 of FIG. 3 specifies that input data 300 comprises rows corresponding to object type PERSON and fields corresponding to property type components LAST_NAME, FIRST_NAME of property type NAME. The object-property mapping 301 may be integrated into input data 300 or may be stored as metadata in association with a data input tool.

In step 606, a row of data is read from the input data, and one or more field values are identified based on delimiters or other field identifiers in the input data.

In step 608, a set of parser definitions associated with the property type of a particular input data field is selected. For example, metadata stored as part of creating a property type specifies a set of parser definitions, as previously described.

In step 610, the next parser definition is applied to an input data field value. Thus, data fields are read from each row of the file and matched to each parser that has been defined for the corresponding property types. For example, assume that the mapping indicates that an input data CSV file comprises (Last Name, First Name) values for Name properties of Person objects. Data fields are read from the input data CSV file and compared to each of the parsers that has been defined for the Name property type given the First Name field and Last Name field. If a match occurs for a (Last Name, First Name) pair value to any of the parsers for the Name property type, then the parser transforms the input data pair of (Last Name, First Name) into modified input data to be stored in an instantiation of a Name property.

If applying a definition at step 610 results in a match to the input data, as tested at step 612, then at step 618 a property instance is created, and the input data field value is stored in a property of the property type associated with the matching sub-definition of the parser definition. For example, assume that the input data matches the regular expression for an ADDRESS value. The mapping specifies how to store the data matching each grouping of the regular expression into a component of the ADDRESS property. In response, an instance of an ADDRESS property is created in computer memory and the matching modified input data value is stored in each component of the property instance.

If no match occurs at step 612, then control transfers to step 614 to test whether other parser definitions match the same input data value. As an example, a property editing wizard in which multiple parsers have been created for a particular property, and through the loop shown in FIG. 6, each of the multiple parsers can be used in matching input data. If no match occurs to the given parser definition, then any other parser definitions for that property type are matched until either no match occurs, or no other parser definitions are available.

If a grouping is empty, then the component is filled by the default value for that component, if it exists. If no other parser definitions are available, then control transfers from step 614 to step 616, at which point an error is raised or the property is discarded.

At step 620, the preceding steps are repeated for all other values and rows in the input data until the process has transformed all the input data into properties in memory.

At step 622, an object of the correct object type is instantiated. For example, the object-property mapping 301 may specify an object type for particular input data, and that type of object is instantiated. The newly created object is associated in memory with the properties that are already in memory. The resulting object is stored in the database in step 624.

Steps in the preceding process may be organized in a pipeline. Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

In various implementations, data objects in ontology 205 stored in database 209, may be stored as graphs. FIG. 7 illustrates various graphs or graph-like relationships (which may comprise data structures or databases), and various structures that may be used to represent them, and which may be used in any embodiment described herein. Graph 701 is an example of an undirected graph, wherein the numbered fields 0-9 comprise nodes and the lines connecting the nodes represent relationships. Clusters 704 shows example clusters, which may be considered as a set of graphs which may be disjoint. Data structure 703 represents an adjacency list which may be used to represent a graph or cluster, such as graph 701 or cluster 704. Advantageously, adjacency lists, such as data structure 703, allow storing of graphs in memory efficiently, particularly where the graphs are lightly-connected graphs or clusters (e.g. graphs or clusters wherein the number of nodes is high compared to the number of linkages per node). Adjacency lists 703 may also allow for efficient adding and removal of nodes, e.g. as an operation in constant time, as entries related to nodes that are not connected to the added or removed nodes may not need to be accessed. Data structure 702 is an adjacency matrix, which may also be used to represent a graph or cluster, such as graph 701 or cluster 704. Advantageously, adjacency matrices such as data structure 702 may allow for more efficient storage and processing of highly-connected graphs or clusters, e.g. where the number of connections per node is comparable to the number of nodes. Adjacency matrices such as data structure 702 may also allow for more efficient access and processing, particularly vectorized access and processing (e.g. using specialized hardware or processor instructions for matrix math), to the graph or cluster data because each matrix row corresponding to a node may have the same size irrespective of the number of linkages by node. As described here, various data items may be stored, processed, analyzed, etc. via graph-related data structures, which may provide various storage and processing efficiency advantages described. For example, as shown in FIG. 7, advantages of graph-related data structures may include: built to handle high volume, highly connected data; efficient in computing relationship queries than traditional databases, either using adjacency matrices, or adjacency lists; can easily add to the existing structure without endangering current functionality; structure and schema of a graph model can easily flex; new data types and its relationship; evolves in step with the rest of the application and any changing business data requirements; can easily add weights to edges; can use optimal amount of computer memory, etc.

The nodes of the graph may represent different information or data objects, for example. The edges of the graph may represent relationships between the nodes. The ontology may be created or updated in various ways, including those described herein, comprising both manual and automatic processes. In some implementations, the ontology and/or data objects in the graph database may be created and/or interacted with visually through various graphical user interfaces. Advantageously, this allows the user to interact with the data objects by placing, dragging, linking and deleting visual entities on a graphical user interface. The ontology may be converted to a low-level (i.e. node list) representation.

In some embodiments, a graph similar to the graph in FIG. 7 may be included in the list of buttons 102 in FIGS. 1A-1F as well as element 144 in FIG. 1A. As described herein, the graph artifact 144 may display a listing of objects. Objects may include people, events, places, companies, property, user-created documents, relationships between all objects, and other properties. Objects may also comprise unique identifiers such that users or the system may be able to link directly to the particular identifier, which may be an alphanumeric string of characters. Such a tool provides users a way of visually mapping the objects to extract information not otherwise clear. The graph may also allow users to interact with the objects in order to edit, modify, or add additional objects or information to the objects. In some embodiments, users may also access documents linked as an object to view or further contribute. In some embodiments, users may view all documents citing to or referring to the particular objects. The documents displayed would be based on the access category levels of the user and each document such that only documents with the same or less secure access category level can be viewed or opened by the user. In some embodiments, documents with more secure access category levels may appear but with an indicator (for example, grayed out) indicating to the user that the document is not viewable due to access category level restrictions, or for any other reason. For the purposes of this invention, objects may be brought into the document and turned into an artifact by a variety of methods. Examples of such methods are disclosed in more detail in U.S. Patent Application Publication No. 2016/0210270 by Kelly et al., the contents of which is hereby incorporated by reference herein in its entirety and for all purposes.

In some embodiments, there may be an alert and/or notification that is automatically transmitted to the device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

A notification may be provided to a user based on changes to a document the user was editing or created. For example, the user that created the example collaboration document 133 in FIG. 1 might want to receive, and might receive, a notification when the document is accessed or modified by another user, or by the system itself. For example, information associated with an object may be updated to include new information such that the access category level of the new information is more restrictive than any other data associated with the object. Any document, such as the collaboration document 133 might be affected by the database change associated with the object such that the data, the object, or references to the data or object may need to be hidden or omitted in the collaboration document as described herein.

In some embodiments, a graph data structure is purposefully built to handle high volume, highly connected data. Some improvements may include: more efficient in computing relationship queries than traditional databases, either using adjacency matrices, or adjacency lists; can easily to add to the existing structure without endangering current functionality (for example, the structure and schema of a graph model can easily flex, and new data type and its relationship); evolve in step with the rest of the application and any changing business data requirements; can easily add weights to edges; use optimal amount of computer memory.

Collaboration Document Example System and Methods

Figure 9:
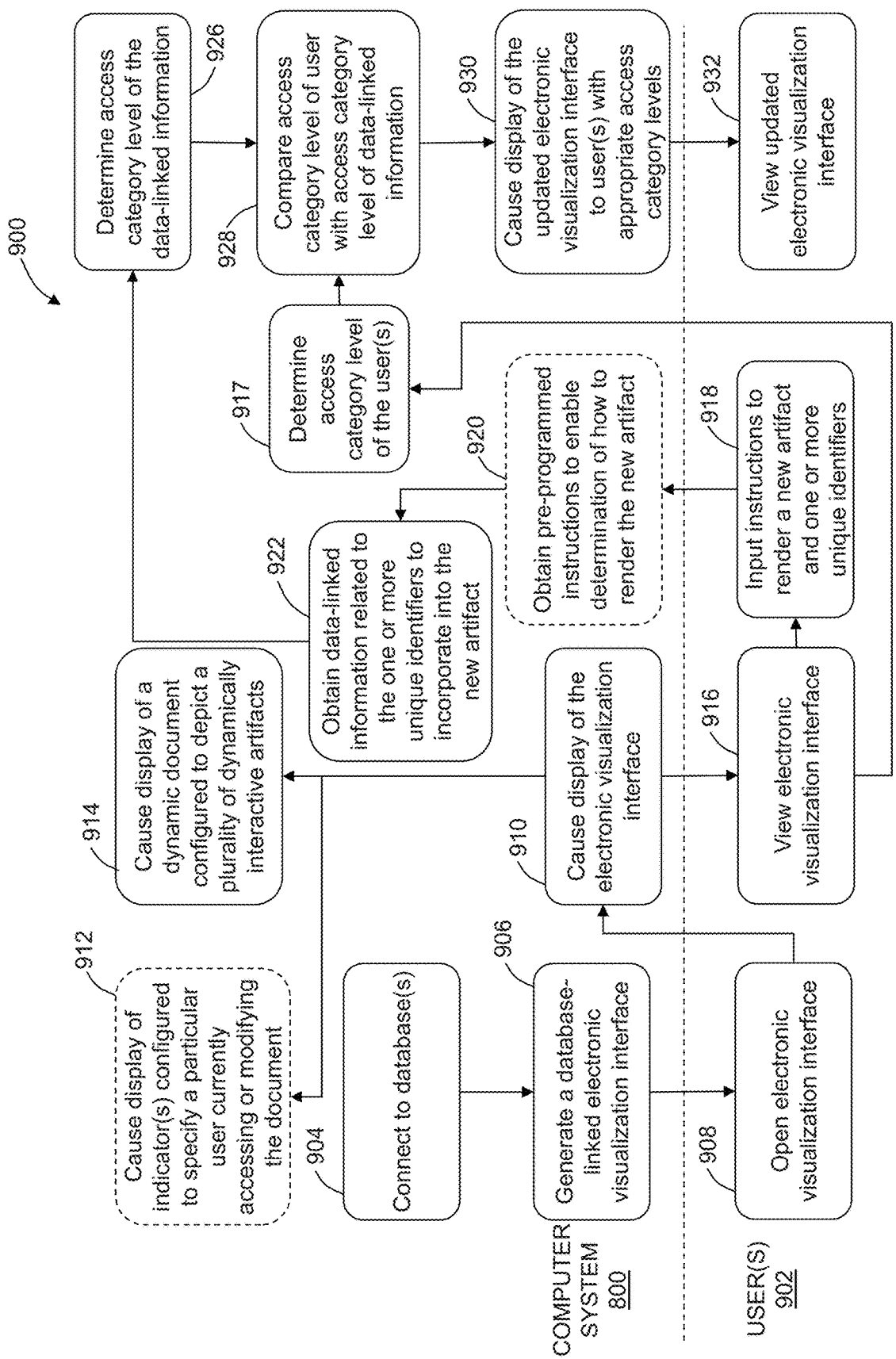
FIG. 9 illustrates a flow chart diagram illustrating functionality of the system related to artifact creation, according to various embodiments of the present disclosure.
Figure 10:
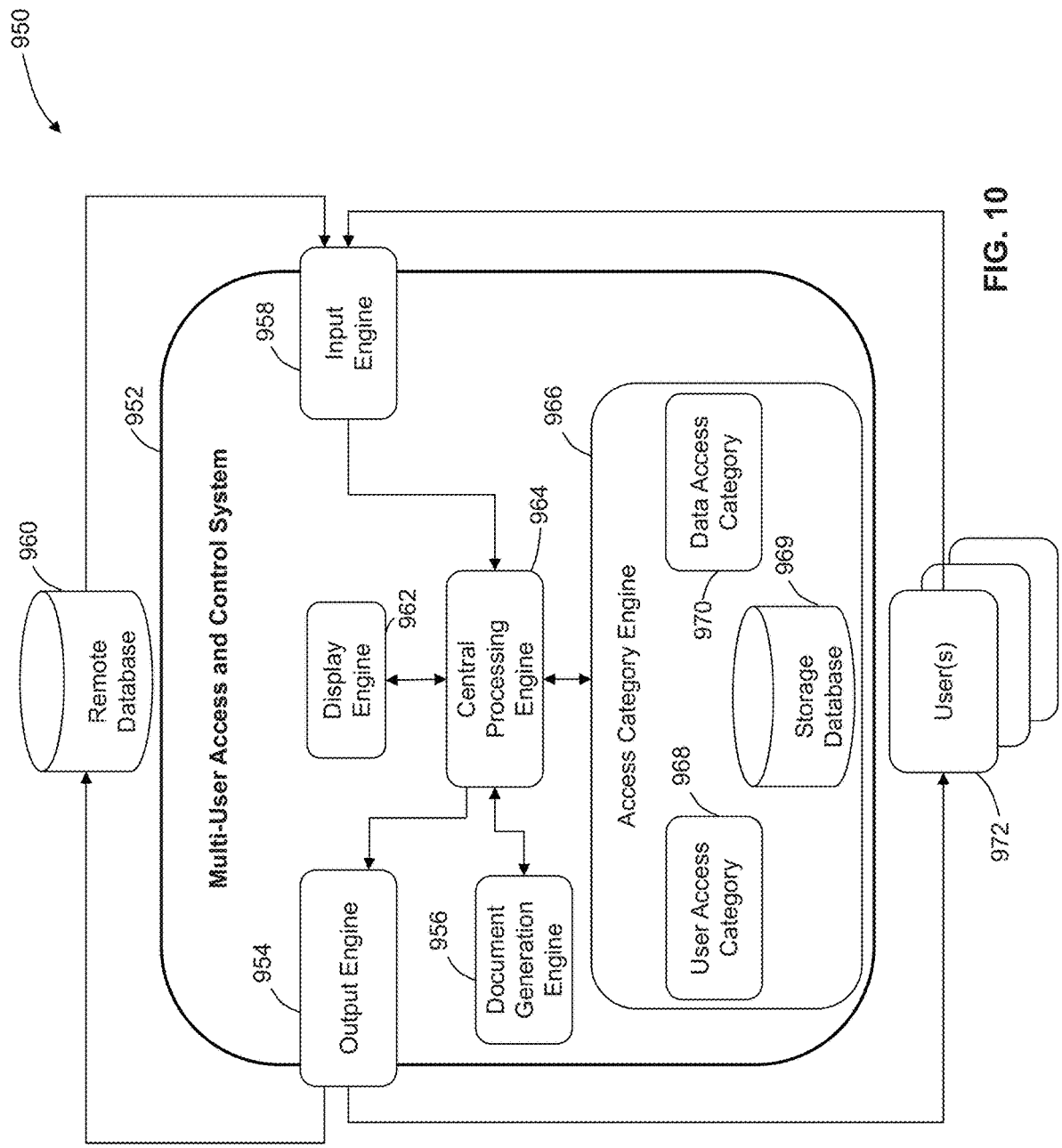
FIG. 10 illustrates an embodiment of a block diagram of a computing system, also illustrating how the components are in communication with each other.

FIGS. 9 and 10 illustrate a system diagram and method diagram of the collaboration document described herein.

However, it should be appreciated that many variations and modifications may be made to the embodiments described herein and in these figures, the elements of which are to be understood as being among other acceptable examples. All such modifications and variations are intended to be included herein within the scope of this disclosure. Also, all steps and blocks should be interpreted to be acceptable in no particular order, except where the system or method would not function for its intended purpose. One or more of the blocks described may be optional in certain implementations.

FIG. 9 illustrates a flow chart diagram illustrating functionality of the system related to artifact creation, according to various embodiments of the present disclosure.

In block 904, the computer system 800 connects to one or more databases. The one or more databases may include database system 210 described in FIG. 2. Also, the computer system 800 may the same computer system 800 described in FIG. 8 or the Multi-User Access and Control System described in FIG. 10.

In block 906, the computer system 800 generates a database-linked electronic visualization interface. This interface may be similar to that of the collaboration document page 100 described in FIG. 1A.

In block 908, one or more users 902 may cause to open the electronic visualization interface, which then, in block 910, causes the computer system 800 to display the electronic visualization interface.

After block 910, and in no particular order, a user may view the electronic visualization interface in block 916. Upon viewing the electronic visualization interface, the computer system 800, in block 917, determines the access category level of the user and stores that information. The computer system 800, in block 914, may cause the display of a dynamic document configured to depict a plurality of dynamically interactive artifacts. The dynamic document may be similar to the collaboration document 133 described in FIG. 1. Also, optionally in block 912, the computer system 800 may cause the display of one or more indicators configured to specify a particular user currently accessing or modifying the document. Block 912 is described in further detail above with respect to FIG. 1F.

In block 918, users 902 may input instruction to the computer system 800 in order to cause the system 800 to render a new artifact. The user 902 may also input one or more unique identifiers associated with the data that will be included in the intended artifact. The user 902 may input the instructions and one or more unique identifiers visually or by any means necessary for the system to render the new artifact. In some embodiments, the system 800 may obtain pre-programmed instructions from a local, network, or remote database to determine how to render the new artifact. The pre-programmed instructions may include default instructions, which may be set by an administrator. The pre-programmed instructions may include custom instructions, which may be set by a user. The pre-programmed instructions may include both default and custom instructions and rules for which set of instructions to implement if the rules conflict. For example, the pre-programmed instructions may include instructions to the system on how to present the artifact graphically (for example, size, colors, font type, or others), how to limit the information presented (for example, not all information associated with the one or more unique identifiers may be desired to be presented in the artifact and only certain types of information may be presented), and how to classify the access category level of the artifact(s) (for example, a new artifact with some data that is a higher access category level than the rest of the data might treat the whole artifact as the most restrictive or least restrictive), or anything else a user or administrator may desire.

In block 920, the computer system 800 may optionally obtain pre-programmed instructions to enable determination of how to render the new artifact based on the instructions received from the user 902. In some embodiments, it may be necessary for the computer system 800 to consult a pre-programmed set of instructions in order to render an artifact correctly. For example, an organization or user may want all person objects to be displayed as an artifact containing name, date of birth, and address only. In another example, an organization or user may want all person objects to be displayed containing all information available to the object. Because there may be variations in each organizations desires, pre-programmed instructions may be provided to the computer system 800 to attain a desired default format between all users. Also, in some embodiments, the pre-programmed set of instruction can either be default instructions set by the program or administrator, or custom instruction set by the user to override any default instruction. There may be instances where a user cannot override default instructions with custom instruction.

In block 922, the computer system 800 obtains the database-linked information related to the one or more unique identifiers. Once the information is obtained, the computer system 800 renders the new artifact with the information from the database.

In block 926, the computer system 800 determines the access category level of the database-linked information it has obtained in block 922. The determination of how to attribute an access category level to an artifact comprising multiple data elements is described above in FIG. 1 (for example, either each particular data element is given an access category level value or the entire artifact is given the most or least restrictive access category level).

In block 928, the computer system 800 compares the stored access category level of each user with the access category level of the data or artifact as determined in block 926. Based on a determination of whether a particular user has the appropriate access category level, the computer system 800, in block 930 causes display of the updated electronic visualization interface to user with the appropriate access category levels, or as described above in relation to FIG. 1. For example, in FIG. 1C, the system may display a placeholder artifact 192 if the user does not have the appropriate access category level to view the artifact. Alternatively, in another example in FIG. 1E, no artifact is shown 193 and no indication that an artifact may appear in the location 193 for other users with the appropriate access category levels. It should also be appreciated that in some embodiments, the text associated with an artifact that is hidden from a particular user may also be desired to be hidden and the system may provide options to users to categorize particular text, data, or artifacts a specific customized access category level absent of any programmed access category level in the database or system.

In block 932, the user 902 may view the updated electronic visualization interface as rendered and displayed by the computer system 800 such that any access category level restrictions are complied with by the computer system 800. Several examples of possible display methods are described in FIGS. 1C to 1E.

Turning to FIG. 10, FIG. 10 illustrates an embodiment of a block diagram of a computing system 950, also illustrating how the components are in communication with each other.

Figure 8:
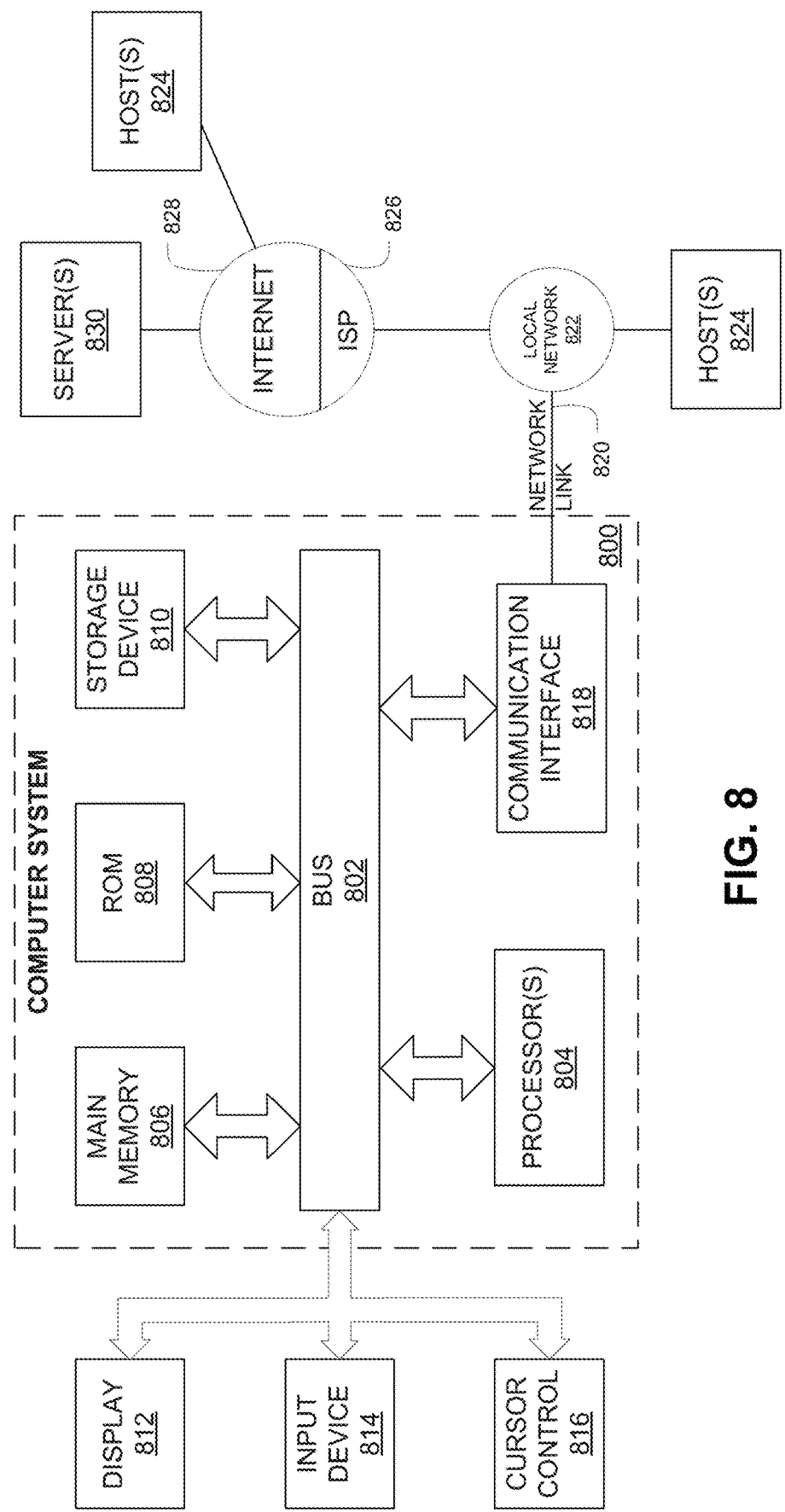
FIG. 8 illustrates a computer system with which certain methods discussed herein may be implemented.

The multi-user access and control system 952 may be the same as the computer system 800 described in FIGS. 8 and 9. Also, the multi-user access and control system 952 includes many components. The components described herein are not meant to be exhaustive but only a sample of what components may be implemented in a multi-user access and control system 952. Some components may be combined and others may be removed or substituted with similar components.

The multi-user access and control system 952, as described in FIG. 10, includes an Input Engine 958, an Access Category Engine 966, a Central Processing Engine 964, a Document Generation Engine 956, a Display Engine 962, and an Output Engine 954. The Remote Database 960 is similar to the Database System described in 210 and contains data objects linked to unique identifiers, where each data object or data associated with each data object is associated with an access category level. Also, the Users 972 are the same users as described herein, each user being associated with an access category level. The Remote Database 960 and the Users 972 may communicate with the multi-user access and control system 952 over a local area network, the internet, or any other suitable means. The Remote Database 960 may also be a local network database or a local database in some implementations.

The Input Engine 958 interfaces with one or more Users 972 through a local area network or the internet. Users 972 may provide instruction or information to the multi-user access and control system 952. The Input Engine 958 receives then sends any instructions or information to the Central Processing Engine 964.

The Central Processing Engine 964 receives data and information from the Input Engine 958 and processes the data depending on the methods described in FIG. 9, for example. In one embodiment, the Central Processing Engine 964 sends data to an Access Category Engine 966, a Document Generation Engine 956, and a Display Engine 962. The Central Processing Engine 964 also communicates with the Display Engine 962, the Document Generation Engine 956, and the Output Engine 954.

The Access Category Engine 966 includes a User Access Category 968 and a Data Access Category 970. The User Access Category 968 receives information from the User 972 upon their accessing of a particular document, and determines the User's 972 access category level. In alternative embodiments, upon determining the User's 972 access category level, the Access Category Engine 966 either sends the results to a Storage Database 969 or a Remote Database 960. The Data Access Category 970 determines the access category level of any data being put into the system from the Remote Database 960, the Users 972, from within the multi-user access and control system 952 itself, or from any other system not shown in FIG. 10 but that might otherwise be in communication with the multi-user access and control system 952. For each user 972 accessing a document, there is a determination for each data element (for example, artifact, data object, or data elements within each of the artifacts or data objects depending on the system's configuration as described above). Each determination is sent to the Central Processing Engine 964 for eventual rendering and generating the electronic visualization interface personalized for each user 972 such that each user 972 only sees data appropriate for the user's access category level.

The Document Generation Engine 956 creates artifacts and objects based on instructions received from the users 972. Such instructions may include instruction on what artifacts and objects to create and unique identifiers for information stored on the Remote Database 960 the multi-user access and control system 952 needs to obtain. The Document Generation Engine 962 will send a request for the data linked to the unique identifier(s) to the Remote Database 960, which will then send the unfiltered information to the Input Engine 958, to be processed by the Central Processing Engine 964, and to then be used in the creation of the artifacts and objects in the Document Generation Engine 956. Upon completion of creating or updating a document, the instructions for the document are sent back to the Central Processing Engine 964 to determine any further updating, filtering, redacting, omitting, or processing of information.

The Display Engine 962 receives the final instructions from the Central Processing Engine 964 on how to render and display the electronic visualization interface (for example, the collaboration document page 100 in FIG. 1A) for each user 972. The Display Engine 962 outputs such personalized information to each user 972 for viewing and interacting with.

In an implementation the multi-user access and control system 952 (or one or more aspects of the multi-user access and control system 952) may comprise, or be implemented in, a "virtual computing environment". As used herein, the term "virtual computing environment" should be construed broadly to include, for example, computer readable program instructions executed by one or more processors (e.g., as described below in the example of FIG. 8) to implement one or more aspects of the modules and/or functionality described herein. Further, in this implementation, one or more engines (e.g., Input Engine 958, Output Engine 954, Display Engine 962, Central Processing Engine 964, Document Generation Engine 956, and/or Access Category Engine 966) of the multi-user access and control system 952 may be understood as comprising one or more rules engines of the virtual computing environment that, in response to inputs received by the virtual computing environment, execute rules and/or other program instructions to modify operation of the virtual computing environment. For example, a request received from the user 972 through the Input Engine 958 may be understood as modifying operation of the virtual computing environment to cause the Document Generation Engine 956 and the Access Category Engine 966 to gather data associated with the request (for example, from a Remote Database 960), the Display Engine 962 to generate an electronic visualization interface with appropriate formats and information for each user 972, and the Output Engine 954 to transmit the generated electronic visualization interface to each user. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the Document Generation Engine 956 and/or gather or determined by the Access Category Engine 966. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the multi-user access and control system 952 as a virtual computing environment may advantageously enable executing different aspects or modules of the system on different computing devices or processors, which may increase the scalability of the system. Implementing one or more aspects of the multi-user access and control system 952 as a virtual computing environment may further advantageously enable sandboxing various aspects, data, modules, or engines of the system from one another, which may increase security of the system by preventing, e.g., malicious intrusion into the system from spreading. Implementing one or more aspects of the multi-user access and control system 952 as a virtual computing environment may further advantageously enable parallel execution of various aspects or modules of the system, which may increase the scalability of the system. Implementing one or more aspects of the multi-user access and control system 952 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

ADDITIONAL IMPLEMENTATION DETAILS AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 8 is a block diagram that illustrates a computer system 800, which may be the same as the computer system 800 described in FIG. 9 and the Multi-User Access and Control System 952 described in FIG. 10, upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. Additionally, a host computer 824 may also communicate with the computer system 800 through the internet 828.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
   one or more hardware computer processors in communication with one or more computer readable storage devices and configured to execute a plurality of computer executable instructions stored on the one or more computer readable storage devices to cause the computing system to:

generate first data for rendering an electronic visualization interface that is configured to be simultaneously accessible by a plurality of users;

based at least in part on a first access level associated with a first user and a second access level associated with a second user, provide, to the first user and the second user, the first data for display of the electronic visualization interface that includes at least a first portion of a first artifact, wherein underlying data corresponding to the first portion of the first artifact corresponds to a third access level;

after providing the first data for display of the electronic visualization interface to the first user and the second user, and based on receipt of one or more updates to the underlying data, adjust the third access level to a fourth access level that is more restrictive than the third access level; and based at least in part on the adjusting of the third access level to the fourth access level, provide, to the first user and the second user, second data for display of an updated version of the electronic visualization interface that includes the first portion of the first artifact for the first user and replaces, for the second user, the first portion of the first artifact with an indication that the fourth access level is required to view the underlying data in the first portion of the first artifact, wherein the indication includes text indicating that the fourth access level is required to view the underlying data.

2. The computing system of claim 1, wherein providing the first data to the first user comprises:

performing a first comparison by comparing the first access level with the third access level; and based on the first comparison, determining that the first user has access to the first portion of the first artifact.

3. The computing system of claim 1, wherein the first artifact includes database-linked elements that are associated with access levels, and wherein the first artifact comprises first database-linked elements.

4. The computing system of claim 3, wherein the first database-linked elements include a first subset of elements and a second subset of elements.

5. The computing system of claim 4, wherein the second user has access to the first subset of elements and the second user is restricted from accessing the second subset of elements.

6. The computing system of claim 5, wherein the updated version of the electronic visualization interface viewable by the second user excludes the first artifact based at least in part on the second user being restricted from accessing the second subset of elements.

7. The computing system of claim 1, wherein providing the second data to the second user comprises:

performing a comparison by comparing the second access level with the fourth access level; and based on the comparison, determining that the second user no longer has access to the first portion of the first artifact.

8. The computing system of claim 1, wherein the one or more hardware computer processors are further configured to execute the plurality of computer executable instructions to cause the computing system to:

access a second electronic database to obtain pre-programmed instructions to enable determination of how to render the first artifact.

9. The computing system of claim 1, wherein the underlying data includes a plurality of database-linked objects, each database-linked object comprising its own access level.

10. The computing system of claim 1, wherein the fourth access level is based at least in part on the underlying data corresponding to the first portion of the first artifact.

11. The computing system of claim 1, wherein the indication also comprises an object that is the same size or same shape of the first portion of the first artifact.

12. The computing system of claim 1, wherein the underlying data includes database-linked elements stored in a remote reference database such that updates to the database-linked elements are configured to be propagated to the electronic visualization interface while the electronic visualization interface is accessed or viewed by the first user and the second user.

13. A method performed by at least one electronic device comprising one or more processors, the method comprising:

generating first data for rendering an electronic visualization interface that is configured to be simultaneously accessible by a plurality of users;

based at least in part on a first access level associated with a first user and a second access level associated with a second user, providing, to the first user and the second user, the first data for display of the electronic visualization interface that includes at least a first portion of a first artifact, wherein underlying data corresponding to the first portion of the first artifact corresponds to a third access level;

after providing the first data for display of the electronic visualization interface to the first user and the second user, and based on receipt of one or more updates to the underlying data, adjusting the third access level to a fourth access level that is more restrictive than the third access level; and based at least in part on the adjusting of the third access level to the fourth access level, provide, to the first user and the second user, second data for display of an updated version of the electronic visualization interface that includes the first portion of the first artifact for the first user and replaces, for the second user, the first portion of the first artifact with an indication that the fourth access level is required to view the underlying data in the first portion of the first artifact, wherein the indication includes text indicating that the fourth access level is required to view the underlying data.

14. The method of claim 13, wherein providing the first data to the first user comprises:

performing a first comparison by comparing the first access level with an access level associated with the first portion of the first artifact; and based on the first comparison, determining that the first user has access to the first portion of the first artifact.

15. The method of claim 13, wherein providing the second data to the second user comprises:

performing a comparison by comparing the second access level with an updated access level associated with the first portion of the first artifact; and based on the comparison, determining that the second user no longer has access to the first portion of the first artifact.

16. The method of claim 13, further comprising:
accessing a second electronic database to obtain pre-programmed instructions to enable determination of how to render the first artifact.

17. The method of claim 13, wherein the fourth access level is based at least in part on the underlying data corresponding to the first portion of the first artifact.

18. The method of claim 13, wherein the first artifact includes database-linked elements that are associated with access levels, and wherein the first artifact comprises first database-linked elements.

19. A non-transitory computer-readable medium storing a set of instructions that are executable by one or more processors to cause the one or more processors perform a method, the method comprising:
generating first data for rendering an electronic visualization interface that is configured to be simultaneously accessible by a plurality of users;
based at least in part on a first access level associated with a first user and a second access level associated with a second user, providing, to the first user and the second user, the first data for display of the electronic visualization interface that includes at least a first portion of a first artifact, wherein underlying data corresponding to the first portion of the first artifact corresponds to a third access level;
after providing the first data for display of the electronic visualization interface to the first user and the second user, and based on receipt of one or more updates to the underlying data, adjusting the third access level to a fourth access level that is more restrictive than the third access level; and
based at least in part on the adjusting of the third access level to the fourth access level, provide, to the first user and the second user, second data for display of an updated version of the electronic visualization interface that includes the first portion of the first artifact for the first user and replaces, for the second user, the first portion of the first artifact with an indication that the fourth access level is required to view the underlying data in the first portion of the first artifact, wherein the indication includes text indicating that the fourth access level is required to view the underlying data.

20. The non-transitory computer-readable medium of claim 19, wherein the first artifact includes database-linked elements that are associated with access levels, and wherein the first artifact comprises first database-linked elements.

* * * * *